(12) United States Patent
Kaye et al.

(10) Patent No.: US 10,608,224 B2
(45) Date of Patent: Mar. 31, 2020

(54) APPARATUS WITH THERMALLY RESPONSIVE INSULATOR BETWEEN BATTERY CELLS

(71) Applicant: Apple Inc., Cupertino, CA (US)

(72) Inventors: Steven Kaye, Oakland, CA (US); Maria N. Luckyanova, San Francisco, CA (US); Josef L. Miler, San Francisco, CA (US); Luke A. Wilhelm, Sausalito, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/246,762

(22) Filed: Jan. 14, 2019

(65) Prior Publication Data

US 2019/0148696 A1 May 16, 2019

Related U.S. Application Data

(63) Continuation of application No. 16/062,498, filed as application No. PCT/US2016/066968 on Dec. 15, 2016.

(Continued)

(51) Int. Cl.
*H01M 6/50* (2006.01)
*H01M 10/653* (2014.01)
(Continued)

(52) U.S. Cl.
CPC ............. *H01M 2/166* (2013.01); *B32B 3/266* (2013.01); *B32B 5/16* (2013.01); *B32B 5/30* (2013.01);
(Continued)

(58) Field of Classification Search
None
See application file for complete search history.

(56) References Cited

U.S. PATENT DOCUMENTS

| 5,120,576 A | 6/1992 | Goldsmith et al. |
| 7,230,404 B2 | 6/2007 | Kimoto et al. |

(Continued)

FOREIGN PATENT DOCUMENTS

| EP | 1153739 | 11/2001 |
| JP | H11-351493 | 12/1999 |

(Continued)

OTHER PUBLICATIONS

Li et al., "Study on the influence of metal residue on thermal degradation of poly(cyclohexene carbonate)," *J. Polym. Res.*, 2011, 18:1177-1183.

(Continued)

*Primary Examiner* — Lucas J. O'Donnell
(74) *Attorney, Agent, or Firm* — Polsinelli PC

(57) ABSTRACT

Insulators and polymer-coated insulators are provided. The insulators can include thermally-insulating nanoparticles and a binder configured to volatilize at a volatilization temperature. Insulators can also include an inorganic thermally-insulating material forming a porous structure. The porous structure can be configured to reduce the mean free path of gases in the insulator as compared to gases outside the porous structure. Polymer-coated insulators including an inorganic thermally-insulating material and a polymer coating disposed on the surface of the inorganic thermally-insulating material are also provided. Insulators can also include thermally-insulating nanoparticles and an opacifier. The opacifier can include a carbonaceous material coated with a refractory material that inhibits oxidation of the carbonaceous material at a carbon oxidation temperature. The insulators or polymer-coated insulators can be disposed between battery cells or battery cell blocks in an apparatus.

25 Claims, 10 Drawing Sheets

Related U.S. Application Data

(60) Provisional application No. 62/356,322, filed on Jun. 29, 2016, provisional application No. 62/267,455, filed on Dec. 15, 2015, provisional application No. 62/267,447, filed on Dec. 15, 2015.

(51) Int. Cl.

| | |
|---|---|
| *H01M 2/16* | (2006.01) |
| *H01M 2/10* | (2006.01) |
| *H01M 2/14* | (2006.01) |
| *B32B 15/09* | (2006.01) |
| *B32B 23/22* | (2006.01) |
| *B32B 27/32* | (2006.01) |
| *B32B 23/08* | (2006.01) |
| *B32B 23/10* | (2006.01) |
| *B32B 15/20* | (2006.01) |
| *B32B 9/04* | (2006.01) |
| *B32B 15/08* | (2006.01) |
| *B32B 5/30* | (2006.01) |
| *B32B 5/16* | (2006.01) |
| *B32B 27/12* | (2006.01) |
| *B32B 15/085* | (2006.01) |
| *B32B 27/14* | (2006.01) |
| *B32B 15/082* | (2006.01) |
| *B32B 15/18* | (2006.01) |
| *B32B 3/26* | (2006.01) |
| *B32B 27/36* | (2006.01) |
| *B32B 27/08* | (2006.01) |
| *B32B 23/04* | (2006.01) |
| *B32B 27/30* | (2006.01) |
| *B32B 7/12* | (2006.01) |
| *B32B 9/02* | (2006.01) |
| *B32B 15/16* | (2006.01) |
| *B32B 27/28* | (2006.01) |

(52) U.S. Cl.
CPC ............. *B32B 7/12* (2013.01); *B32B 9/02* (2013.01); *B32B 9/041* (2013.01); *B32B 9/045* (2013.01); *B32B 9/047* (2013.01); *B32B 15/08* (2013.01); *B32B 15/082* (2013.01); *B32B 15/085* (2013.01); *B32B 15/09* (2013.01); *B32B 15/16* (2013.01); *B32B 15/18* (2013.01); *B32B 15/20* (2013.01); *B32B 23/042* (2013.01); *B32B 23/08* (2013.01); *B32B 23/10* (2013.01); *B32B 23/22* (2013.01); *B32B 27/08* (2013.01); *B32B 27/12* (2013.01); *B32B 27/14* (2013.01); *B32B 27/285* (2013.01); *B32B 27/306* (2013.01); *B32B 27/308* (2013.01); *B32B 27/322* (2013.01); *B32B 27/365* (2013.01); *H01M 2/1016* (2013.01); *H01M 2/1094* (2013.01); *H01M 2/145* (2013.01); *H01M 2/1613* (2013.01); *H01M 2/1633* (2013.01); *H01M 2/1653* (2013.01); *H01M 2/1686* (2013.01); *B32B 2255/10* (2013.01); *B32B 2255/26* (2013.01); *B32B 2260/025* (2013.01); *B32B 2260/046* (2013.01); *B32B 2262/10* (2013.01); *B32B 2262/101* (2013.01); *B32B 2262/105* (2013.01); *B32B 2262/106* (2013.01); *B32B 2264/102* (2013.01); *B32B 2264/108* (2013.01); *B32B 2307/212* (2013.01); *B32B 2307/304* (2013.01); *B32B 2307/72* (2013.01); *B32B 2307/7265* (2013.01); *B32B 2457/10* (2013.01)

(56) References Cited

U.S. PATENT DOCUMENTS

| | | | |
|---|---|---|---|
| 7,736,799 | B1 | 6/2010 | Hermann et al. |
| 7,749,647 | B1 | 7/2010 | Hermann et al. |
| 7,749,650 | B1 | 7/2010 | Hermann et al. |
| 7,781,097 | B2 | 8/2010 | Mehta et al. |
| 7,820,319 | B2 | 10/2010 | Mehta et al. |
| 8,277,965 | B2 | 10/2012 | Hermann et al. |
| 8,367,233 | B2 | 2/2013 | Hermann et al. |
| 8,481,191 | B2* | 7/2013 | Hermann ............ H01M 2/1077 429/100 |
| 8,541,126 | B2* | 9/2013 | Hermann ............ H01M 2/1016 429/120 |
| 8,592,067 | B2 | 11/2013 | Yokoyama et al. |
| 8,592,076 | B2 | 11/2013 | Sugita et al. |
| 8,875,828 | B2 | 11/2014 | Rawlinson et al. |
| 8,968,949 | B2 | 3/2015 | Hermann et al. |
| 9,093,726 | B2 | 7/2015 | Prilutsky et al. |
| 2003/0082379 | A1 | 5/2003 | Hrubesh et al. |
| 2003/0099844 | A1* | 5/2003 | Hanahata ............ C09D 183/04 428/447 |
| 2005/0192366 | A1* | 9/2005 | Ou ........................ C01B 33/158 521/64 |
| 2006/0068278 | A1 | 3/2006 | Bloom et al. |
| 2006/0164795 | A1* | 7/2006 | Jones .................. H01M 2/1094 361/600 |
| 2006/0261304 | A1* | 11/2006 | Muthukumaran ......................... H01M 8/04007 252/62 |
| 2010/0136404 | A1 | 6/2010 | Hermann et al. |
| 2011/0003209 | A1 | 1/2011 | Katayama et al. |
| 2011/0159340 | A1 | 6/2011 | Hu et al. |
| 2012/0244393 | A1 | 9/2012 | Stanek et al. |
| 2012/0326071 | A1 | 12/2012 | Pasquero et al. |
| 2014/0193685 | A1 | 7/2014 | Lim |
| 2014/0224465 | A1 | 8/2014 | Andrasi et al. |
| 2016/0003404 | A1* | 1/2016 | Shibata .................. C04B 38/00 428/192 |

FOREIGN PATENT DOCUMENTS

| | | |
|---|---|---|
| JP | 2011-23355 | 2/2011 |
| JP | 2013-512175 | 4/2013 |
| WO | WO 2004/064082 | 7/2004 |
| WO | WO 2012/000184 | 1/2012 |
| WO | WO 2012/065288 | 5/2012 |
| WO | WO 2014/087834 | 6/2014 |
| WO | WO 2014/132652 | 9/2014 |

OTHER PUBLICATIONS

Phillips et al., "Thermal decomposition of poly(propylene carbonate): End-capping, additives, and solvent effects," *Polymer Degradation and Stability*, 2016, vol. 125, pp. 129-139.

Spencer et al., "Stabilization of the Thermal Decomposition of Poly(Propylene Carbonate) Through Copper Ion Incorporation and Use in Self-Patterning," *Journal of Electronic Materials*, 2011, vol. 40, No. 6, pp. 1350-1363.

Spencer et al., "Decomposition of poly(propylene carbonate) with UV sensitive iodonium salts," *Polymer Degradation and Stability*, 2011, vol. 96, pp. 686-702.

* cited by examiner

APPARATUS WITH THERMALLY RESPONSIVE INSULATOR BETWEEN BATTERY CELLS

PRIORITY

This patent application is a continuation of U.S. patent application Ser. No. 16/062,498, filed Jun. 14, 2018, and entitled "Microporous Insulators," which is a 371 of PCT Patent Application No. PCT/US2016/066968, filed Dec. 15, 2016, and entitled "Microporous Insulators," which claims the benefit of U.S. Provisional Patent Application No. 62/267,447, filed Dec. 15, 2015, and entitled "Microporous Insulators Having Multifunctional Particles," U.S. Provisional Patent Application No. 62/267,455, filed Dec. 15, 2015, and entitled "Microporous Insulators Having Multifunctional Particles," U.S. Provisional Patent Application No. 62/356,322, filed Jun. 29, 2016, and entitled "Microporous Insulators Having Multifunctional Particles," under 35 U.S.C. § 119(e), each of which is incorporated herein by reference in its entirety.

FIELD

This disclosure relates generally to thermal insulators. Thermal insulators can be used in a variety of applications, including as insulators between battery cells in multi-cell battery packs.

BACKGROUND

A battery can include a battery pack that has multiple battery cells. Battery cells can experience a kind of thermal event—called thermal runaway—under abnormal conditions. Thermal runaway of a battery cell refers to a condition in which the battery cell produces heat faster than it can be dissipated, resulting in an increase in temperature that increases the rate of heat generation.

SUMMARY

In one aspect, the disclosure is directed to thermal insulators (e.g., microporous insulators). The insulator includes an inorganic thermally-insulating material having a porous structure. A binder is disposed within the porous structure and configured to volatilize at a volatilization temperature. In certain variations, the insulator can include at least 10 vol % of the binder. In some variations, the insulator can include at least 5 volume % of the inorganic thermally-insulating material.

In some aspects, the inorganic thermally-insulating material includes thermally-insulating nanoparticles disposed in contact with each other to define the porous structure. In various aspects, the thermally-insulating nanoparticles can have a mean particle size less than 100 nm. Alternatively, the inorganic thermally-insulating material can include aerogel particles. In non-limiting variations, the inorganic thermally-insulating material can include silica, carbon, zirconia, titania, or a ceramic.

In some aspects, the inorganic thermally-insulating material includes ceramic nanoparticles. In some variations, the ceramic nanoparticles can include silica, titania, alumina, or zirconia. In some variations, the ceramic nanoparticles have an average BET surface area of at least 100 m$^2$/g. In additional variations, the ceramic nanoparticles include fumed silica or silica aerogel.

In some variations, the binder material is an organic material or a siloxane material. In additional variations, the binder can be a material selected from a polyalkyl carbonate, a polyacrylate, a polyether, polytetrafluoropenthylene (PTFE), polyvinyl alcohol, a lignosulfonate, methylcellulose, a parafin, a silicone, an organo-silane, a starch, a dextrin, and a wax emulsion. In further variations, the binder can be polypropylene carbonate, polyethylene carbonate, or polyhexane carbonate.

In additional variations, the binder is at least 20 vol. % of the insulator. Alternatively, the binder is at least 50 vol. % of the insulator. In a further alternative, the binder is at least 70 vol. % of the insulator by volume.

In another aspect, the binder has a volatilization temperature not greater than 500° C. at 1 atmosphere pressure. In one alternative, the binder has a volatilization temperature of not greater than 400° C. at 1 atmosphere pressure. In another alternative, the binder has a volatilization temperature not greater than 300° C. at 1 atmosphere pressure. In another alternative, the binder has a volatilization temperature not greater than 250° C. at 1 atmosphere pressure. In another alternative, the binder has a volatilization temperature not greater than 200° C. at 1 atmosphere pressure. In another alternative, the binder has a volatilization temperature not greater than 175° C. at 1 atmosphere pressure. In another alternative, the binder has a volatilization temperature not greater than 150° C. at 1 atmosphere pressure.

In further variations, the insulator includes a fibrous material. Non-limiting examples of fibrous materials can include glass fibers, quartz fibers, silicon carbide fibers, alumina fibers, and ceramic fibers.

In further variations, the mechanical strength of the insulator is larger before volatilization of the binder than after volatilization of the binder. For example, the mechanical strength can be measured as a bend strength. In some variations, the bend strength of the insulator can be at least ten times greater before volatilization of the binder than after volatilization of the binder.

In another aspect, the disclosure is directed to an insulator including an inorganic thermally-insulating material forming a porous structure. The porous structure can be configured to reduce the mean free path of gases in the porous structure as compared to gases outside the porous structure.

In some variations, the inorganic thermally-insulating material includes a plurality of thermally-insulated nanoparticles disposed in contact with each other. Spaces between nanoparticles can form pores in the insulator. In some variations, the thermally-insulating nanoparticles have a mean particle size less than 100 nm. Alternatively, the inorganic thermally-insulating material can include aerogel particles. In some variations, the inorganic thermally-insulating material can include a silica, carbon, zirconia, titania, or a ceramic.

In additional variations, the inorganic thermally-insulating material can include multifunctional thermally-insulating nanoparticles. The multifunctional thermally-insulating nanoparticles can include a core, a first layer disposed over the core, and a second layer disposed over the first layer. The first layer is either an insulating layer or an opacifier, and the second layer is the other of the insulating layer or opacifier.

The multifunctional thermally-insulating nanoparticles can include any number of additional insulation and opacifier layers, in any order. For example, in some variations, an additional insulating layer is disposed on the second layer, and an additional opacifier layer is disposed on the additional insulating layer. Alternatively, an additional opacifier layer can be disposed on the second layer, and an additional insulating layer can be disposed on the additional opacifier layer. By way of example and without limitation, one, two, three, four, five, six, seven, eight, or more layers of each of the insulating layer and/or opacifier layer can be added.

In another aspect, the disclosure is directed to a polymer-coated insulator. The polymer-coated insulator includes an inorganic thermally-insulating material and a polymer coating disposed on a surface of the inorganic thermally-insulating material. In some non-limiting variations, the inorganic thermally-insulating material can include thermally-insulating nanoparticles in contact with each other to define a porous structure. The inorganic thermally-insulating material can include aerogel particles. In some variations, the inorganic thermally-insulating material can be selected from silica, carbon, zirconia, titania, and a ceramic.

In some variations, the polymer coating can be a polyurethane, an epoxy, a polyacrylate, a polyester, or a polyimide. The polymer coating can have various thicknesses. In some examples, the polymer coating can have an average thickness of less than or equal to 500 microns. In some examples, the polymer coating can have an average thickness of less than or equal to 400 microns. In some examples, the polymer coating can have an average thickness of less than or equal to 300 microns. In some examples, the polymer coating can have an average thickness of less than or equal to 200 microns. In some examples, the polymer coating can have an average thickness of less than or equal to 100 microns.

In some examples, the polymer coating can have a thickness of less than or equal to 300 microns. The polymer coating can penetrate into the inorganic thermally-insulating material, for example more than 10 microns on average.

In additional variations, the insulators or polymer-coated insulators can include an opacifier configured to absorb electromagnetic radiation at one or more infrared wavelengths. In various aspects, the opacifier has a mean extinction coefficient greater than $1 \times 10^4$ $m^{-1}$ at temperatures greater than 250° C. In various non-limiting variations, the opacifier can be silicon carbide, titania, or a carbonaceous material. In some non-limiting variations, the opacifier includes a carbonaceous material such as graphite, carbon black, carbon nanotubes, or graphene. The carbonaceous material can be coated with a refractory material configured to inhibit oxidation at a carbon oxidation temperature. Non-limiting examples of such refractory materials include silica, alumina, titania, nickel, boron nitride, zirconia, and $AlF_3$. In some variations, an oxidation temperature of the opacifier coated with refractory material is greater than 800° C. In some additional variations, the carbonaceous material has an aspect ratio greater than 5:1. Non-carbonaceous opacifiers can also be used.

In further variations, a thermal conductivity of the insulator is less than 0.05 W/m·K after volatilization of the binder, for example at 800° C. In other variations, the thermal conductivity of the insulator is greater than 0.1 W/m·K before volatilization of the binder, for example at room temperature.

In another aspect, the disclosure is directed to an insulator including a thermally-insulating material and an opacifier. The opacifier includes a carbonaceous material coated with a refractory material that inhibits oxidation of the carbonaceous material at a carbon oxidation temperature. In some aspects, the thermally insulating material is an inorganic thermally-insulating material having a porous structure. The thermally-insulating material can be any insulating material, including, but not limited to, inorganic thermally-insulating materials described herein.

In some variations, the carbonaceous material is selected from graphite, carbon black, carbon nanotubes, and graphene. In some variations, the refractory material is selected from silica, alumina, titania, nickel, boron nitride, zirconia, and $AlF_3$. In some variations, an oxidation temperature of the opacifier coated with refractory material is greater than 800° C. In some variations, the carbonaceous material has an aspect ratio greater than 5:1. In some variations, the carbonaceous material is covalently bonded to the refractory material. In some variations, the insulator can include not more than 40 wt % the opacifier.

In another aspect, the disclosure is directed to methods of manufacturing insulators. In some insulators, a binder is dissolved in a solvent to form a binder solution. The inorganic thermally-insulated material is exposed to the binder solution, which impregnates the porous structure of the inorganic thermally-insulated material. The binder can be solidified in the porous structure of the inorganic thermally-insulated material. In some variations, the binder is precipitated within pores of the inorganic thermally insulating material.

In another aspect, the method of manufacturing includes exposing a porous inorganic thermally-insulating material to a binder precursor composition. The binder precursor composition can include binder monomers. The binder monomers are then polymerized to form a binder-impregnated inorganic thermally-insulating material.

Various additional methods are contemplated for insulators described herein. In another aspect, the inorganic thermally-insulated material is exposed to the binder solution to impregnate the porous structure. The binder-impregnated material is deposited on a substrate. The binder is then solidified within the porous structure. In some aspects, the binder-impregnated material is heated to solidify the binder within the porous structure.

In another aspect, the binder-impregnated material can be deposited in a die. The die can be pressurized to solidify the binder in the porous structure.

In another aspect, the method of manufacturing an insulator includes mixing a binder and an inorganic thermally-insulated material to form a mixture. The mixture can be compressed to form an inorganic thermally-insulating material having a porous structure, with the binder impregnating the porous structure. Alternatively, the mixture can be extruded to form an inorganic thermally-insulating material having a porous structure, with the binder impregnating the porous structure. The methods can further include heating the binder-impregnated inorganic thermally-insulating material.

In another aspect, the disclosure is directed to methods of manufacturing a polymer-coated insulator. The surface of an inorganic thermally-insulating material is exposed to a coating composition to form a polymer coating on the surface of the inorganic thermally-insulating material. The polymer coating is allowed to penetrate at least an average of 10 microns into the inorganic thermally-insulating material. The polymer coating is then solidified.

In some variations, the coating composition can include one or more precursors (e.g., monomers) of the polymer coating. In various aspects, the coating composition includes the polymer of the polymer coating.

In some variations, the step of exposing the inorganic thermally-insulating material to the polymer coating includes spray coating the inorganic thermally-insulating material surface with the coating composition. In other variations, the exposing step includes dip coating the surface of the inorganic thermally-insulating material with the coating composition.

In various methods of manufacturing insulators and polymer-coated insulators, additional components such as fibrous materials and opacifiers (including coated opacifiers) can be added to any method step and in any order.

In a further aspect, the disclosure is directed to an apparatus including a first battery cell and a second battery cell with an insulator or polymer-coated insulator disposed there-between. The apparatus can also include a metal layer disposed between the first and second battery cells. In one variation, the apparatus includes a first insulator in thermal contact with a first battery cell, a second insulator in thermal contact with a second battery cell, and a metal layer disposed between the first and second insulators.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Description of various embodiments will now be made with reference to the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Heat can propagate between battery cells in lithium-ion batteries. Under these conditions, a battery cell temperature can rise due to internal self-heating until the battery cell fails, releasing heat and vaporized electrolytes. In a multi-cell battery pack, heat generated from such a thermal runaway event can induce thermal runaway in neighboring battery cells, ultimately propagating to the entire battery pack. This propagation risk limits the use of high energy, thermally-sensitive battery cells, such as those containing $Li(Ni,Co,Al)O_2$, $LiCoO_2$, or nickel-rich $Li(Ni,Co,Mn)O_2$ cathode materials, and therefore limits overall pack energy density.

One method of reducing the propagation risk of thermal runaway is to interpose thermal insulation between battery cells, which may involve placing a sheet or other planar-structured body between the battery cells. Such thermal insulation reduces a rate of heat transfer to neighboring cells during a thermal runaway event. Moreover, if such thermal insulation has an in-plane thermal conductivity greater than a through-plane thermal conductivity, heat can be conducted away from neighboring battery cells, and instead be directed into a battery pack cooling system or other non-sensitive thermal mass. The present disclosure provides insulators and methods of making the same. In various aspects, the insulators can be disposed between individual battery cells or cell blocks in multi-cell battery packs.

I. Insulators in Insulated Housings Between Battery Cells

Figure 1A:
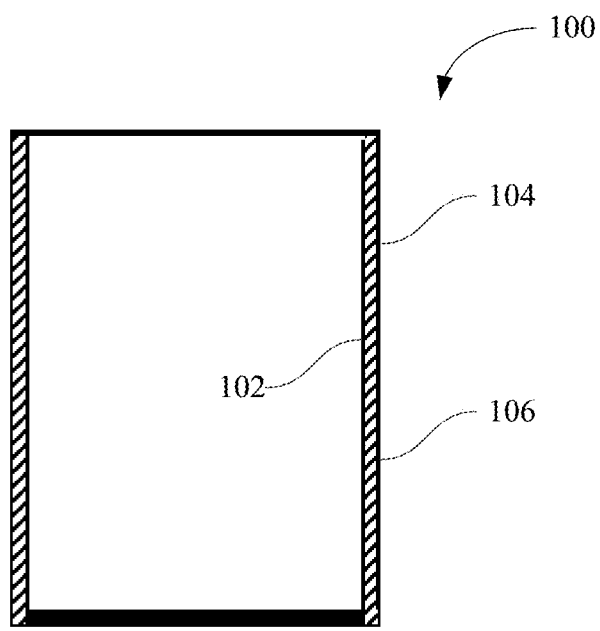
FIG. 1A is a cross-sectional view depicting an insulated housing for a battery cell, according to some illustrative embodiments.
Figure 1B:
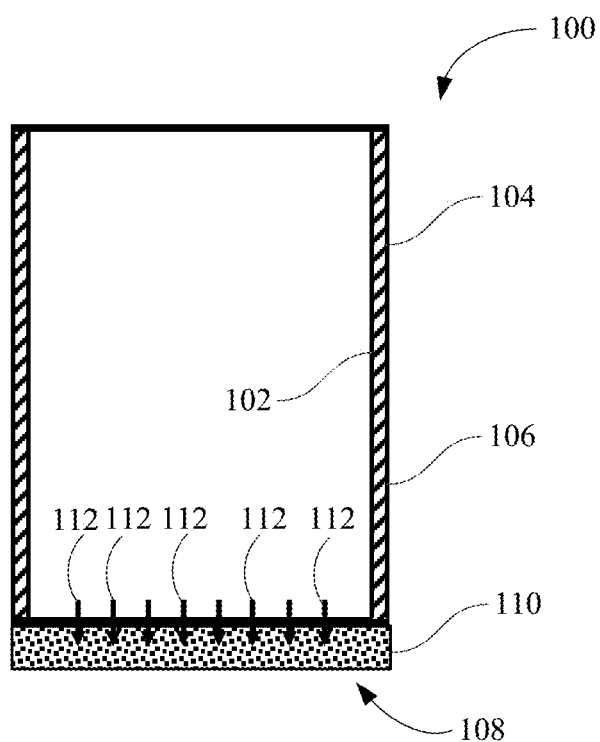
FIG. 1B is a cross-sectional view depicting an insulated housing for a battery cell including an insulator and a thermally-conductive layer on a bottom portion, according to some illustrative embodiments.

FIGS. 1A & 1B represent a cross-sectional view of an insulated housing 100 for a battery cell, according to some illustrative embodiments. The insulated housing 100 includes an inner metallic layer 102, an insulator 104, and an outer metallic layer 106. The inner metallic layer 102 and the outer metallic layer 106 may be formed of an aluminum material or a stainless steel material. The insulator 104 can be selected from any insulator described herein. The insulator 104 can be formed of an inorganic thermally-insulating material, such as that described in relation to FIGS. 2-7. The outer metallic layer 106 serves as the thermal conductor for the insulated housing 100, conducting heat from the insulator out of the housing. The insulator 104 may be disposed within all walls of the insulated housing 100 and a lid thereof, such as shown in FIG. 1A.

Alternatively, the insulator 104 may be only in some walls, with non-insulated walls allowing heat to conduct into or out of the battery cell. In some embodiments, such as that shown in FIG. 1B, the insulator 104 lacks a bottom portion 108 of the insulated housing 100. The bottom portion 110 includes a thermally-conductive layer (e.g., a metal layer or plate) that allows heat to exit the battery cell. In some variations, heat can transfer during a thermal runaway failure event. A direction of such heat flow is shown by arrows 112 in FIG. 1B.

Figure 1C:
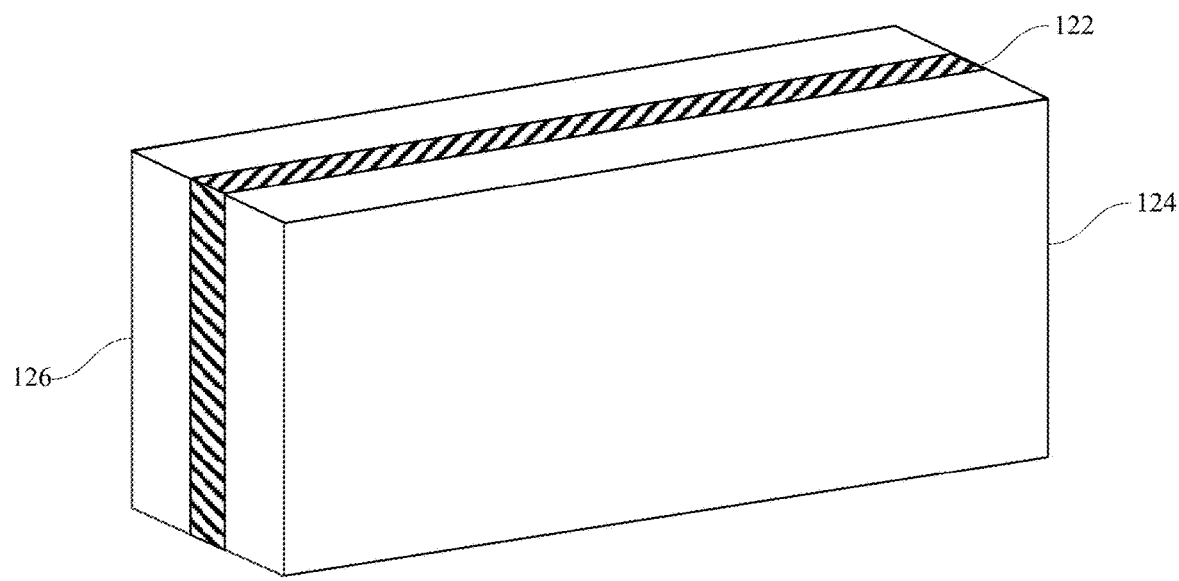
FIG. 1C is a perspective view depicting a battery pack having an insulator disposed between a first battery cell and a second battery cell, according to some illustrative embodiments.

FIG. 1C represents a perspective view of an insulator 122 (e.g., a microporous insulator) disposed between a first battery cell 124 and a second battery cell 126, according to some illustrative embodiments. Although FIG. 1C depicts the battery pack 120 as having two battery cells 124, 126, this variation is not intended as limiting. More than two battery cells can be arranged having an insulator disposed between each. An insulator 122 may be disposed in any configuration between such battery cells.

Figure 1D:
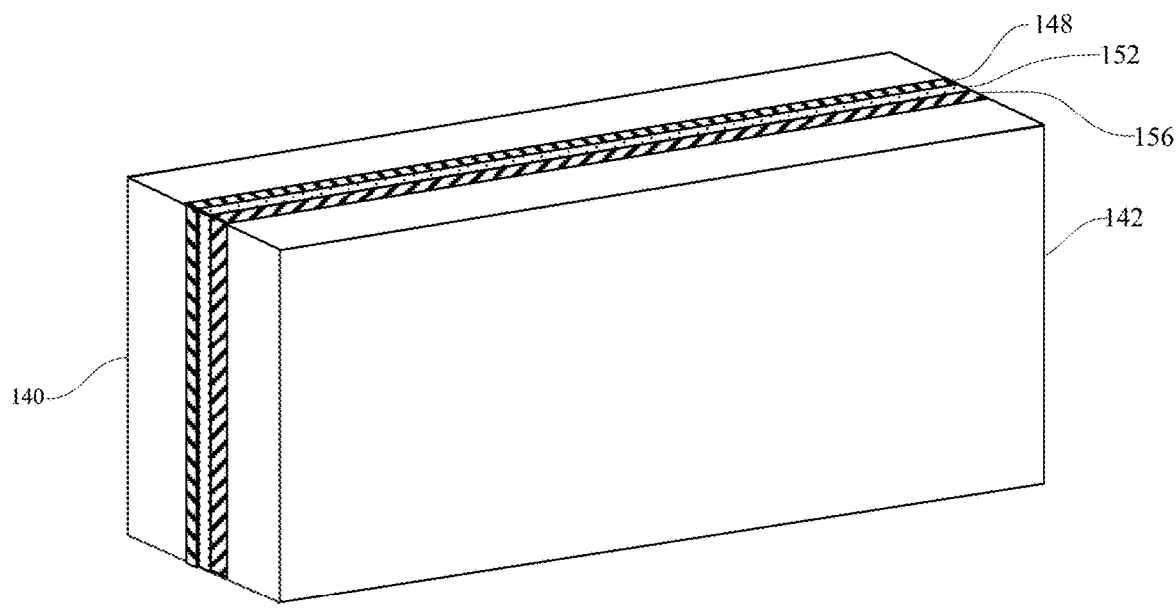
FIG. 1D is a cross-sectional view depicting layers of insulated housing, according to some illustrative embodiments.

FIG. 1D represents a perspective view of two battery cells 140 and 142 separated by insulators 148 and 156 and metal layer 152, according to some illustrative embodiments. In the embodiment of FIG. 1D, each of battery cells 140 and 142 is in thermal contact with insulator 148 or 156, respectively. Metal layer 152 separates insulators 148 and 156. More specifically, insulator 148 is in thermal contact with battery cell 140. Metal layer 152 is in thermal contact with insulator 148 opposite battery cell 140. Metal layer 152 is in thermal contact with insulator 156 opposite insulator 148. Insulator 156 is in thermal contact with metal layer 152 opposite insulator 148. Insulator 156 also is in thermal contact with battery cell 142 opposite metal layer 152. In various aspects, the components in thermal contact with each other can be adhered one to the other via an adhesive, or the like.

Metal layer 152 can be any metal, including but not limited to an aluminum alloy or stainless steel. Insulator 148 can be any variation of insulator described herein. In various aspects, metal layer 152 can serve as a thermal conductor to conduct heat away from the battery.

It will be recognized that the thicknesses of the insulators and metal layers are not to scale. Although FIG. 1D depicts the battery pack 120 as having two battery cells 124, 126, this variation is not intended as limiting. The battery pack 120 may have more than two battery cells.

Insulators, metal layers, or other components may be disposed in any configuration between such battery cells in any order or arrangement. It will further be recognized that the insulators depicted in FIG. 1C or 1D can be any insulator described herein or known in the art. In different variations, the insulator can be an insulator or a polymer-coated insulator, as described herein.

In various aspects, the insulator thickness can range from 0.05-50 mm. In some variations, the insulator thickness is from 1 mm to 15 mm. In some variations, the insulator thickness is from 1 mm-10 mm. Likewise, when a metal is associated with the insulator, the thickness of the metal is from 0.001-2 mm. In some variations, the metal thickness can be from 0.01 to 1.0 mm thickness. In some variations, the metal thickness can be from 0.05-0.5 mm thickness. The metal layer can be any metal known in the art, including aluminum, steel, or an alloy thereof.

II. Insulators

Various insulators are described herein. In various aspects, the insulator can be an insulator including an inorganic thermally-insulating material forming a porous structure, and a binder disclosed herein. Alternatively, the insulator can include an inorganic thermally-insulating material having a porous structure configured to reduce the mean free path of gases in the insulator as compared to gases outside the porous structure. In still other aspects, the insulator is a polymer-coated insulator. In such instances, a polymer coating is disposed on the surface of the inorganic thermally-insulating material, and penetrates into the thermally insulating material.

Though the above variations are described in detail herein, it will be recognized that other insulators known in the art can be used. Although the insulators can be used in battery technologies, the insulators also can be used in other uses.

II. A. Thermal Shutdown Insulators

In some variations, the insulator can have an inorganic thermally-insulating material that forms a porous structure, and a binder disposed within the porous structure. The inorganic thermally-insulating material can be formed of inorganic thermally-insulating nanoparticles in a porous structure. In some variations, the inorganic thermally-insulating material can be formed of particles that contain pores (e.g., aerogels).

As disclosed herein, porous structures can have a mean pore diameter. In some variations, the mean pore diameter is equal to or less than 500 nm. In further variations, the mean pore diameter is equal to or less than 200 nm. In further variations, the mean pore diameter is equal to or less than 100 nm. In further variations, the mean pore diameter is equal to or less than 50 nm. In further variations, the mean pore diameter is equal to or less than 20 nm.

When a binder is disposed in the inorganic thermally-insulating material, the insulator can exhibit enhanced mechanical properties relative to an insulator without the binder. These enhanced mechanical properties can include, without limitation, enhanced tensile strength, enhanced compressive strength, enhanced bend strength, enhanced shear strength, and enhanced fatigue strength (e.g., vibration resistance).

The binder can be configured to volatilize at a volatilization temperature. As described herein, a volatilization temperature is a temperature at which a 1 mm diameter binder particle volatilizes within a ten minute volatilization time. In some alternatives, a volatilization temperature is a temperature at which a 1 mm diameter binder particle volatilizes within a five minute volatilization time. In further alternatives, a volatilization temperature is a temperature at which 1 mm diameter binder particle volatilizes within a one minute volatilization time. After volatilization of the binder, the inorganic thermally-insulating material has a low thermal convection and low thermal conductivity.

The inorganic thermally-insulating material can be any thermally-insulating material known in the art. In some variations, the inorganic thermally-insulating material can be a porous material. Some examples of such porous materials include materials formed of thermally-insulating particles, or aerogels. Example materials include, but are not limited to, silica, carbon, zirconia, and titania.

Figure 2:
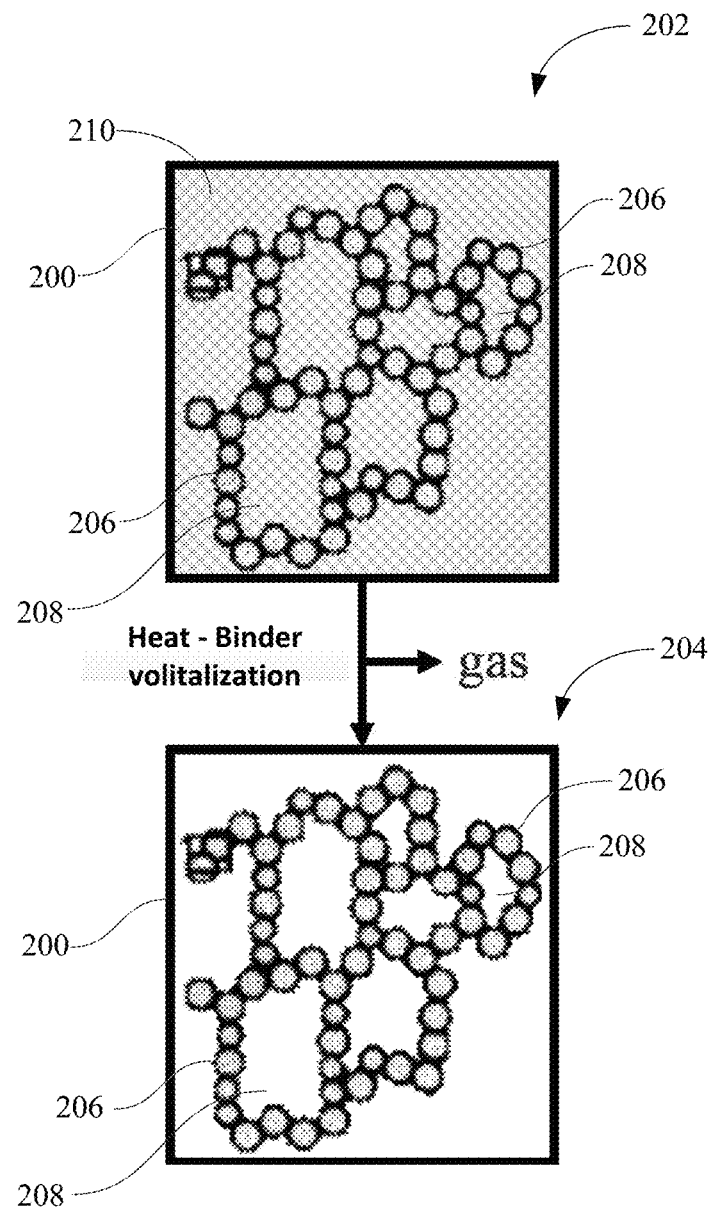
FIG. 2 is a schematic diagram depicting a portion of an insulator before and after a thermal decomposition event, according to some illustrative embodiments.

FIG. 2 depicts a schematic diagram of a portion of an insulator 200 at time 202 before a thermal event and at time 204 after a thermal event, according to some illustrative embodiments. The thermal event may correspond to a thermal runaway in a battery cell. In the embodiment of FIG. 2, the insulator 200 includes thermally-insulating nanoparticles 206, which may be nano-scale in dimension (i.e., <100 nm). In the insulator 200, individual thermally-insulating nanoparticles 206 aggregate to form cells 208, which may be open cells, closed cells, or combinations thereof. These cells 208 define pores and, as a combination, form a porous structure. It will be appreciated that the cells 208 can extended dimensionally to yield solid bodies of virtually any size and shape.

The insulator 200 also includes a binder 210 disposed therein. The binder 210 may fill substantially all pores in the porous structure, as shown in a binder-containing insulator 202 of FIG. 2. The binder 210 may improve a mechanical strength and a durability of the insulator 200 at lower temperatures (e.g., less than 200° C.). The binder 210 may also increase an overall thermal conductivity of the insulator 200 at these lower temperatures. At a volatilization temperature (e.g., greater than 200° C.), the binder 210 volatilizes to form a highly insulating material, a liquid, a gas, or some combination thereof. Such volatilization may be endothermic. The binder may alter in phase, decompose, or both, above the volatilization temperature.

After the thermal event, the insulator 200 is substantially free of the binder 210, as shown in non-binder containing insulator 204 of FIG. 2. The volatilization temperature can depend on a type of binder 210 selected to fill the insulator 200.

It will be appreciated that the binder 210 allows the insulator 200 to be more thermally-conductive under normal operating temperatures of a battery cell. However, during or after a thermal event, the insulator 200 becomes more thermally-insulating. In various aspects, the heat from the thermal event triggers a volatilization event in the insulator 200.

Moreover, the reduced surface area of contact between thermally-insulating nanoparticles 206 can hinder heat flow via conduction. The thermal-insulating nanoparticles may have high sphericity in order to reduce a surface area of contact between adjacent particles. A reduced surface area of contact lowers an interface available for heat to flow between particles, thereby lowering the overall thermal conductivity of the insulator 200. Thus, by reducing convective heat transfer and conductive heat transfer, the insulator 200 offers an improved resistance to thermal heat flows relative to conventional insulators.

Returning to FIG. 1C, the insulator 122 can include an insulating layer having a porous structure. Insulator 122 can, for example, be formed of thermally-insulating nanoparticles disposed in contact with each other to define a porous structure. Alternatively, the insulator can be formed of aerogel particles. A binder configured to volatilize at a volatilization temperature can be disposed within the porous structure. The volatilization temperature is below an onset temperature for thermal runaway in the battery cells 124, 126. If the temperature of part of insulator 122 reaches the volatilization temperature, the binder volatilizes and leaves the insulator 122. After volatilization, a thermal conductivity of the insulator 122 decreases. In some variations, the binder can absorb heat from the battery cell. Such heat absorption may help prevent thermal runaway from spreading to the other battery cell. In other variations, the binder can release heat to the battery cell. The mechanical strength of the insulator 122 may also decrease.

Likewise, returning to FIG. 1D, insulators 148 and 156 can be insulators having an inorganic thermally-insulating material having a porous structure. The inorganic thermally-insulating materials can be formed of thermally-insulating nanoparticles or aerogels. A binder configured to volatilize at a volatilization temperature can be disposed within the porous structure. When the binder in either insulator 148 or 156 volatilizes, the thermal conductivity of the insulator decreases. Heat can be conducted to metal layer 152, and then travels away from the battery along the metal layer. The metal layer can conduct heat away from the battery.

It will be noted that the layers of FIGS. 1C and 1D need not be to scale. For example, in various aspects, the various metal layers can be substantially thinner than the inorganic thermally-insulating materials. Likewise, the various the inorganic thermally-insulating materials, metal layers, and battery cells can be kept in contact with an adhesive, which can have a thickness less than or greater than the thickness of that of the inorganic thermally-insulating material or metal layers.

Figure 3:
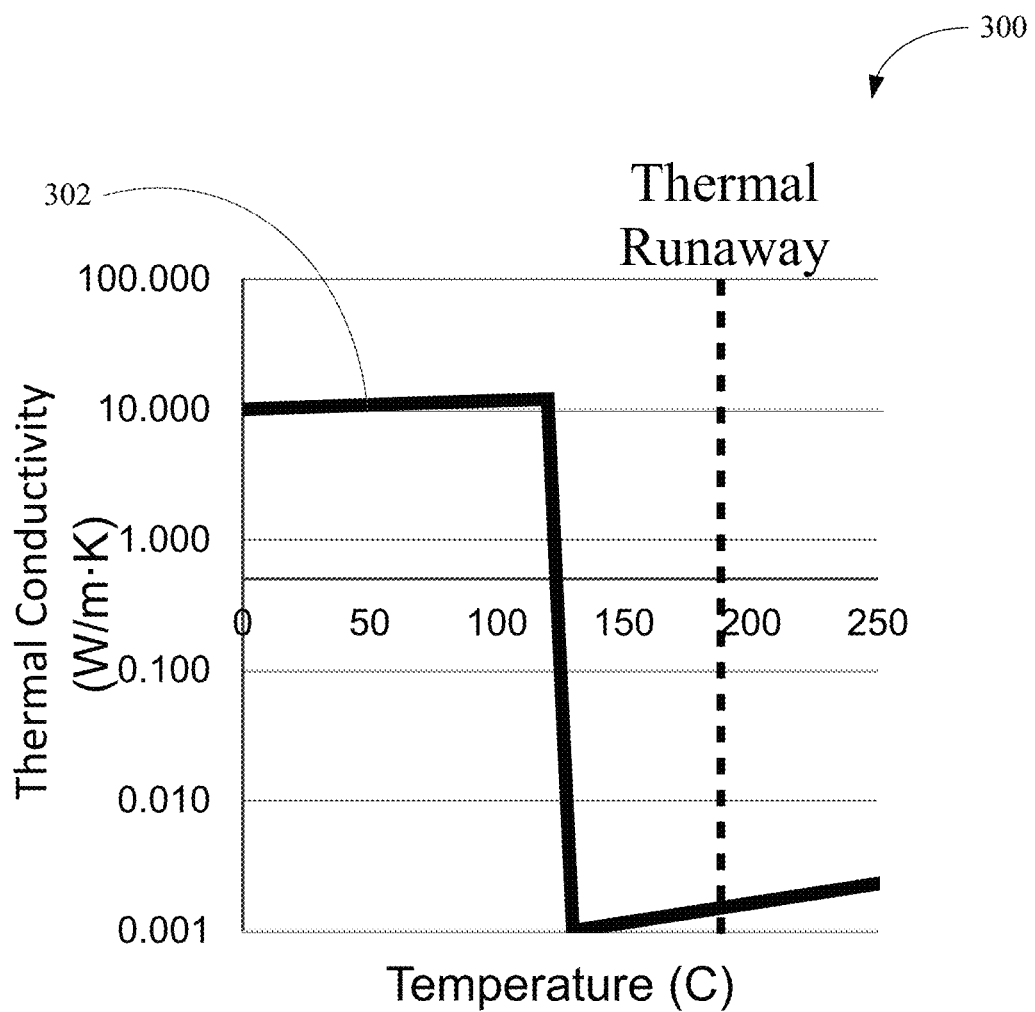
FIG. 3 is a representative graph depicting a change in thermal conductivity of an insulator due to a thermal runaway event, according to some illustrative embodiments.

FIG. 3 presents a graph 300 of a change in thermal conductivity of an insulator due to a thermal runaway event, according to some illustrative embodiments. Heat leading up to the thermal runaway event induces a rapid drop in thermal conductivity, as shown by a solid line 302 in FIG. 3. At temperatures associated with normal operation, the insulator has a room temperature thermal conductivity greater than 0.1 W/m·K and enhanced mechanical strength. At temperatures associated with thermal runaway (i.e., >80° C.), the insulator has a low thermal conductivity (i.e., <0.05 W/m·K) after volatilization of the binder. In FIG. 3, the insulator is depicted with a volatilization temperature of about 120° C., which is lower than an onset temperature for thermal runaway (i.e., about 190° C.). It will be understood that the volatilization temperature and the onset temperature depicted in FIG. 3 are not intended as limiting. Other volatilization temperatures and onset temperatures are possible, yet still remain within the scope of this disclosure.

In some variations, the insulator has a thermal conductivity at 25° C. of not more than 0.5 W/(m*K) after the binder is volatilized. In some variations, the insulator has a thermal conductivity at 25° C. of not more than 0.4 W/(m*K) after the binder is volatilized. In some variations, the insulator has a thermal conductivity at 25° C. of not more than 0.35 W/(m*K) after the binder is volatilized. In some variations, the insulator has a thermal conductivity at 25° C. of not more than 0.3 W/(m*K) after the binder is volatilized. In some variations, the insulator has a thermal conductivity at 25° C. of not more than 0.2 W/(m*K) after the binder is volatilized. In some variations, the insulator has a thermal conductivity at 25° C. of not more than 0.1 W/(m*K) after the binder is volatilized. In some variations, the insulator has a thermal conductivity at 25° C. of not more than 0.05 W/(m*K) after the binder is volatilized. In some variations, the insulator has a thermal conductivity at 25° C. of not more than 0.03 W/(m*K) after the binder is volatilized. In some variations, the insulator has a thermal conductivity at 25° C. of not more than 0.02 W/(m*K) after the binder is volatilized.

Examples of thermally-insulating nanoparticles include silica (e.g., fumed silica), zirconia, ceramics (e.g., titanium dioxide), insulative fiber products, and mica. Other materials are also possible. In some aspects, the inorganic thermally-insulating material includes ceramic nanoparticles. In some variations, the ceramic nanoparticles can include silica, titania, alumina, or zirconia. In some variations, the ceramic nanoparticles have an average BET surface area of at least 100 m$^2$/g. In additional variations, the ceramic nanoparticles include fumed silica or silica aerogel.

In some variations, the thermally-insulating nanoparticles are formed of a material having a bulk thermal conductivity equal to or lower than the bulk thermal conductivity of silicon dioxide at a temperature between 600-1000° C. In some variations, the thermally-insulating nanoparticles may be formed of Y-stabilized $ZrO_2$, $Gd_3Zr_2O_7$, and doped versions of these bulk compositions. In some variations, the thermally-insulating nanoparticles material can include silicon dioxide.

Figure 4:
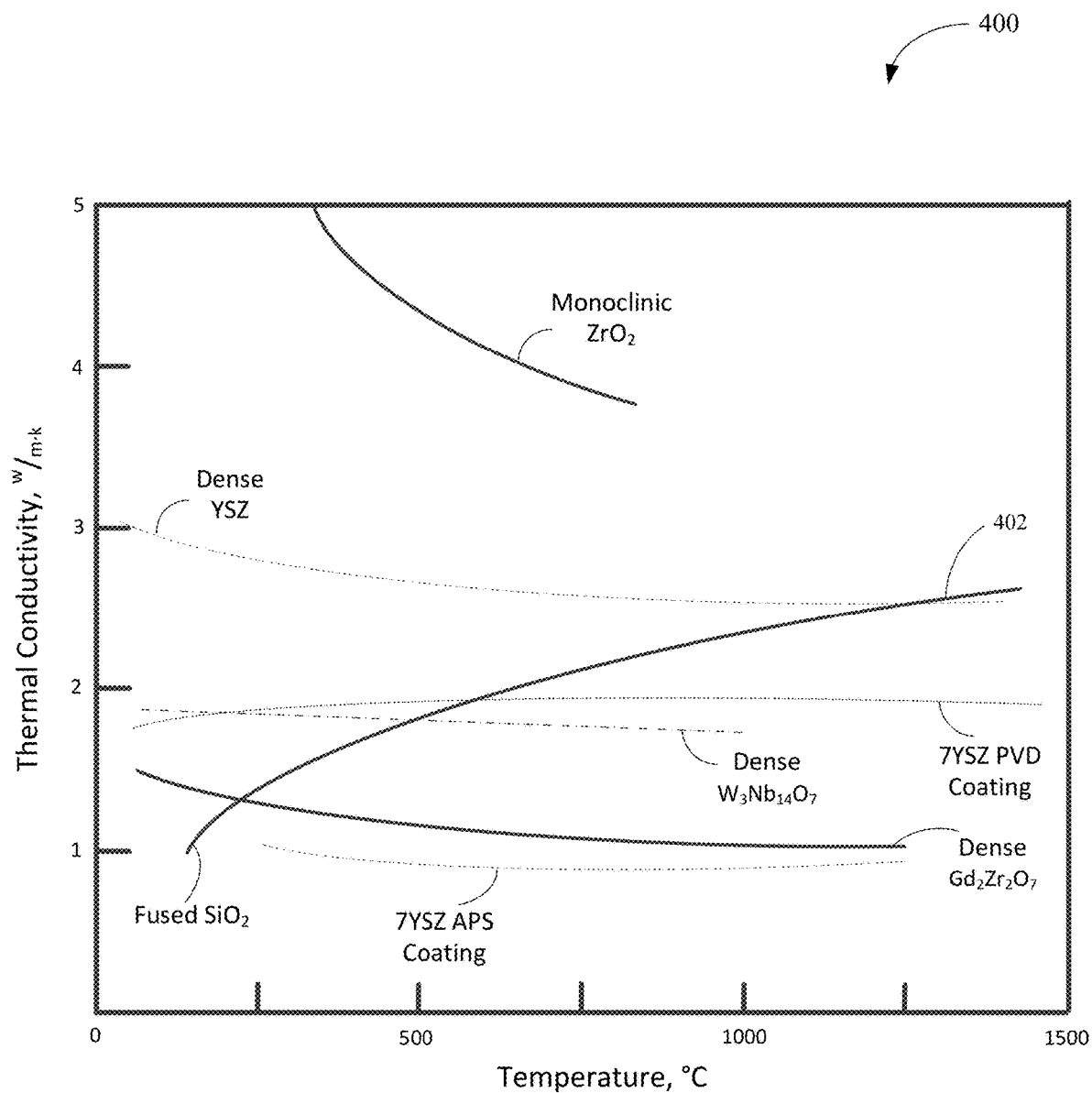
FIG. 4 is a representative graph of thermal conductivity versus temperature for various materials, according to some illustrative embodiments.

FIG. 4 presents a graph 400 of thermal conductivity versus temperature for various the inorganic thermally-insulating materials, according to some illustrative embodiments. The temperature indicated in the graph 400 spans from approximately 100° C. to 1500° C. A bulk thermal conductivity of silicon dioxide is shown by a dash-dot line 402. Applicable materials for the thermally-insulating nanoparticles include materials having bulk thermal conductivities below the dash-dot line 402 in a temperature range of 600-1000° C. It will be appreciated, however, that materials not explicitly shown in FIG. 4 may also be within the scope of this disclosure.

In some aspects, the thermally-insulating nanoparticles can have at least one diameter in the nanometer dimension (i.e., at least one dimension less than 1 micron). In some embodiments, the average diameter of the thermally-insulating nanoparticles is 500 nm or less. In some embodiments, the average diameter of the thermally-insulating nanoparticles is 100 nm or less. In some embodiments, average diameter of the thermally-insulating nanoparticles is 50 nm or less. In some embodiments, the average diameter of the thermally-insulating nanoparticles is 20 nm or less.

In such variations, the average thermally-insulating nanoparticle diameter can be at least 100 nm. In some variations, the average thermally-insulating nanoparticle diameter can be at least 250 nm. In some variations, the average thermally-insulating nanoparticle diameter can be at least 400 nm.

In some aspects, the ceramic nanoparticles have an average BET surface area of at least 100 $m^2/g$. In some aspects, the ceramic nanoparticles have an average BET surface area of at least 150 $m^2/g$. In some aspects, the ceramic nanoparticles have an average BET surface area of at least 200 $m^2/g$. In some aspects, the inorganic thermally-insulating material has at least 5 vol. % of the insulator. In some aspects, the inorganic thermally-insulating material has at least 10 vol. % of the insulator. In some aspects, the inorganic thermally-insulating material has at least 15 vol. % of the insulator. In some aspects, the inorganic thermally-insulating material has at least 20 vol. % of the insulator. In some aspects, the inorganic thermally-insulating material has at least 25 vol. % of the insulator. In some aspects, the inorganic thermally-insulating material has at least 30 vol. % of the insulator.

The insulator can have a density after binder volatilization. In some variations, the insulator has a density of at least 0.1 g/mL after binder volatilization. In some variations, the insulator has a density of at least 0.15 g/mL after binder volatilization. In some variations, the insulator has a density of at least 0.2 g/mL after binder volatilization. In some variations, the insulator has a density of at least 0.3 g/mL after binder volatilization. In some variations, the insulator has a density of at least 0.35 g/mL after binder volatilization. In some variations, the insulator has a density of at least 0.4 g/mL after binder volatilization. In some variations, the insulator has a density of at least 0.5 g/mL after binder volatilization. In some variations, the insulator has a density of at least 0.6 g/mL after binder volatilization. In some variations, the insulator has a density of at least 0.7 g/mL after binder volatilization.

In some variations, the average diameter of the thermally-insulating nanoparticles is about 13 nm. In some aspects, the particle size distribution of the thermally-insulating nanoparticles can be multi-modal, having multiple size distributions. For example, thermally-insulating particles can have a first average diameter and second average diameter as described herein.

The insulators can include a binder disposed in the inorganic thermally-insulating material (e.g., thermally-insulating nanoparticles). In some variations, the binder may include polymers, molecules, or both, that become volatile at the target temperature. Such volatility may include a phase change (e.g., sublimation, melting, boiling, etc.), decomposition (e.g., chemical disassociation, burning, etc.), or any combination thereof. Non-limiting examples of polymers that can be used as binders include polyalkyl carbonates (e.g., polypropylene carbonate and polyethylene carbonate), cyanoacrylate, and polybutylacrylate), polyethers (e.g., polyethylene glycol), polytetrafluoroethylene (PTFE), polyvinyl alcohol, lignosulfonates, methylcellulose, paraffins, polyacrylates (e.g., polymethyl methacrylate (PMMA)), silicones, organo-silanes, starches, dextrins, and wax emulsions. In other aspects, binders can include naphthalene, ferrocene, or cyclododecane. In some variations, the binder may be filled with a thermally-conductive additive to improve ambient temperature thermal conductivity. Such additives may include carbon-fiber, carbon-black, carbon nanotubes, highly-oriented polymers (e.g. polyethylene), or metallic nanowires.

Upon volatilization, the binder forms a gas, liquid, or combination thereof that leaves the inorganic thermally-insulating material. The binder does not volatilize under lower temperatures, such as those of the normal operating conditions of a battery. It will be appreciated that before volatilization of the binder, the insulator has a thermal conductivity greater than that after volatilization. In some variations, the insulator may also have a greater mechanical strength before volatilization of the binder. Non-limiting examples of mechanical strength include tensile strength, compressive strength, bend strength, shear strength, and fatigue strength (e.g., vibration resistance). Other types of mechanical strengths are possible.

In another aspect, the binder has a volatilization temperature not greater than 500° C. at 1 atmosphere pressure. In one alternative, the binder has a volatilization temperature of not greater than 400° C. at 1 atmosphere pressure. In another alternative, the binder has a volatilization temperature not greater than 300° C. at 1 atmosphere pressure. In another alternative, the binder has a volatilization temperature not greater than 250° C. at 1 atmosphere pressure. In another alternative, the binder has a volatilization temperature not greater than 200° C. at 1 atmosphere pressure. In another alternative, the binder has a volatilization temperature not greater than 175° C. at 1 atmosphere pressure. In another alternative, the binder has a volatilization temperature not greater than 150° C. at 1 atmosphere pressure. In another alternative, the binder has a volatilization temperature not greater than 100° C. at 1 atmosphere pressure.

In some embodiments the binder is thermally stable to at least 60° C. In some embodiments the binder is thermally stable to at least 75° C. In some embodiments the binder is thermally stable to at least 90° C. It will be appreciated that, during normal operating conditions, the binder allows superior mechanical properties in the insulator over state-of-the-art porous insulation.

In some variations, the volatilization temperature can have a range of 80-250° C. In some variations, the volatilization temperature can have a range of 120-160° C. In some variations, the volatilization temperature can have a range of 150-220° C. It will be recognized that variations of the temperatures can be selected based on differences in designs or materials.

When the binder is present in the insulator, the insulator can exhibit enhanced mechanical properties relative to its unfilled variant. These enhanced mechanical properties include, without limitation, enhanced tensile strength, enhanced compressive strength, enhanced bend strength, enhanced shear strength, and enhanced fatigue strength (e.g., enhanced vibration resistance). The insulator can exhibit higher thermal conductivity due to increased solid matter capable of supporting heat transfer. The binder may be selected to determine the volatilization temperature where the binder alters phase, decomposes, or both. The binder may also be selected, in type and by volume fraction, to determine mechanical properties and thermal conductivity of the insulator.

When the binder is not present in the insulator, such as after the binder has volatilized, gas molecules (e.g., air molecules) may traverse the insulator by diffusing through pores therein. However, the mean free path of gas molecules is reduced relative to an unobstructed, open volume (e.g., air in ambient space). This reduced mean free path produces a low thermal convection within the porous structure that retards heat transfer through the insulators. When the inorganic thermally-insulating material is formed of thermally-insulating nanoparticles, the thermally-insulating nanoparticles meet at points of low contact area. Such low contact area can impede heat transfer through the insulator, resulting in a low thermal conduction. The combination of low thermal convection and low thermal conduction allows the insulator to function as a highly-effective thermal insulator.

Figure 5:
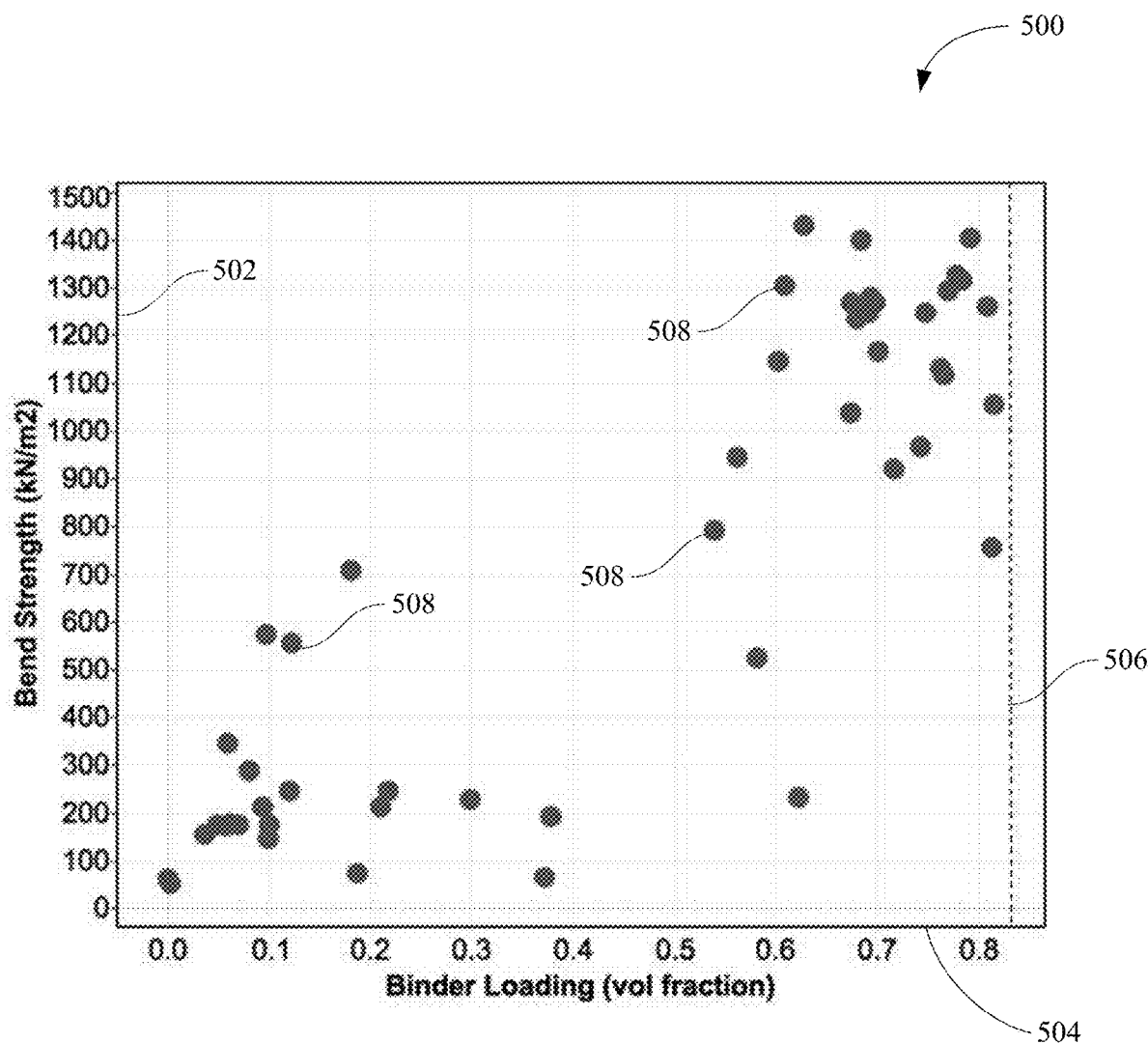
FIG. 5 is a representative graph depicting bend strength versus binder loading for insulators having different binder loadings, according to some illustrative embodiments.

FIG. 5 presents a representative graph 500 of bend strength versus binder loading for insulators having different binder loadings, according to some illustrative embodiments. The ordinate 502 spans bend strengths from about 0 to 1500 kN/m$^2$, while the abscissa 504 spans binder loadings from 0 to about 0.85 in volume fraction. A dashed vertical line 506 illustrates a theoretical maximum for the binder loading, which is determined by a total volume of pores within the insulators. Each data point 508 in the graph 500 corresponds to a single specimen tested under a three-point load. The binder is PMMA, which was either polymerized in-situ within pores of the thermally insulating material or absorbed into the inorganic thermally-insulating material. As shown in FIG. 5, the bend strength of the insulator increases with binder loading. Binder loadings above 0.6 are capable of increasing the bend strength almost 30 times that of unfilled insulators (i.e., binder loading of 0). Although FIG. 5 presents bend strength as a representative mechanical property, this presentation is for purposes of illustration only. The presence of a binder within insulators may increase or enhance other mechanical properties, such as tensile strength, compressive strength, bend strength, shear strength, fatigue strength (e.g., vibration resistance), and so forth.

Figure 6:
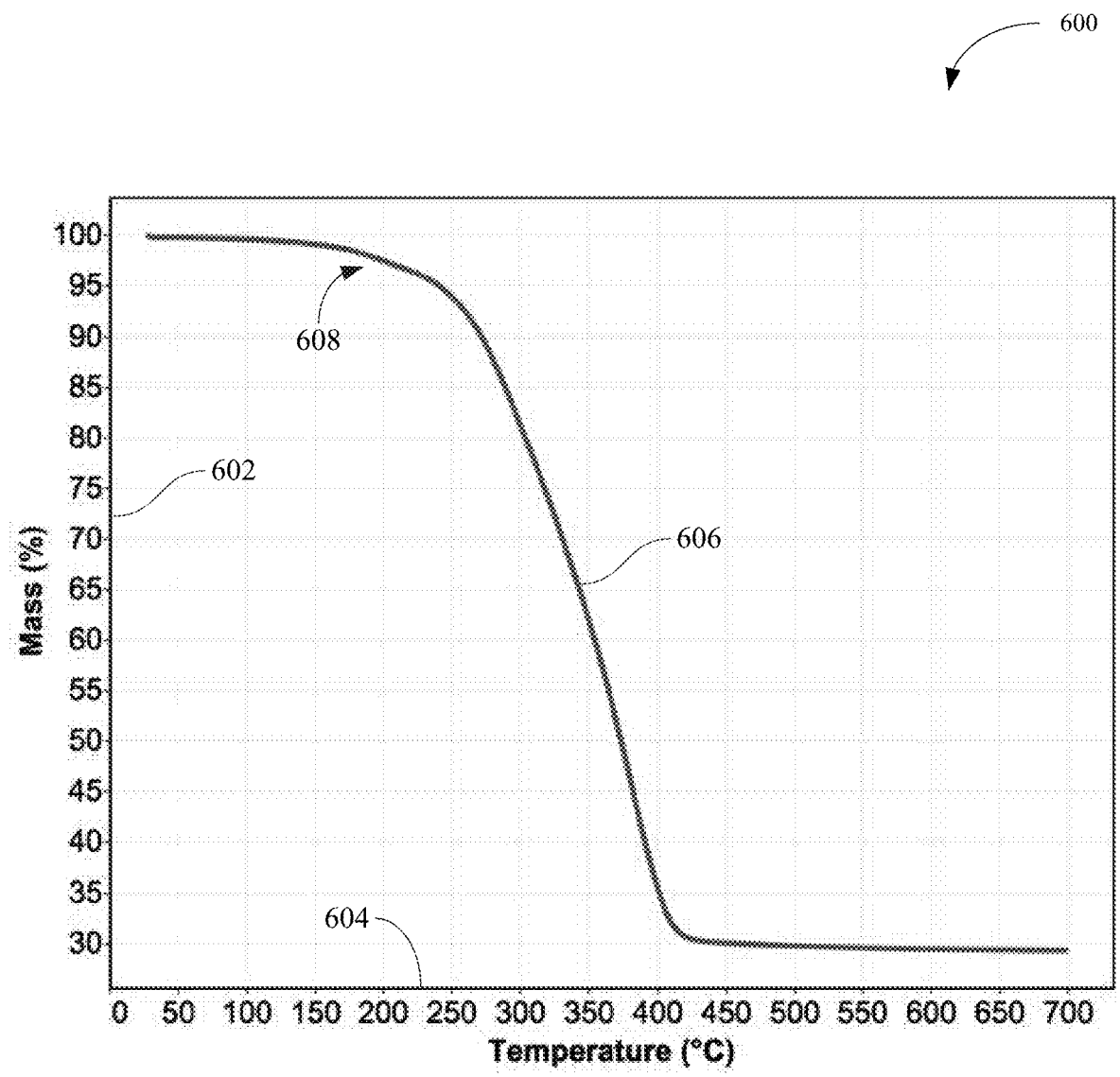
FIG. 6 is a representative graph depicting mass loss for an insulator undergoing a heat treatment, according to some illustrative embodiments.

FIG. 6 presents a representative graph 600 of mass loss for an insulator undergoing a heat treatment, according to some illustrative embodiments. The insulator includes a binder of PMMA loaded at 0.72. The ordinate 602 spans a mass percent from about 30% to 100%, while the abscissa 604 spans temperatures from about 0 to 750° C. A curve 606 is plotted showing a mass of the insulator as temperature is progressively increased. The binder disposed in the insulator begins to volatilize out at approximately 178° C. (see arrow 608) and is completely volatilized out by about 425° C. It will be appreciated that, in general, the binder can be selected in composition to predetermine a profile for thermally-induced volatilization (e.g., start and end temperatures, curve shape, etc.). Although FIG. 6 depicts mass loss associated with PMMA, this depiction is not intended as limiting. Other binders and combinations of binders can be used.

Figure 7:
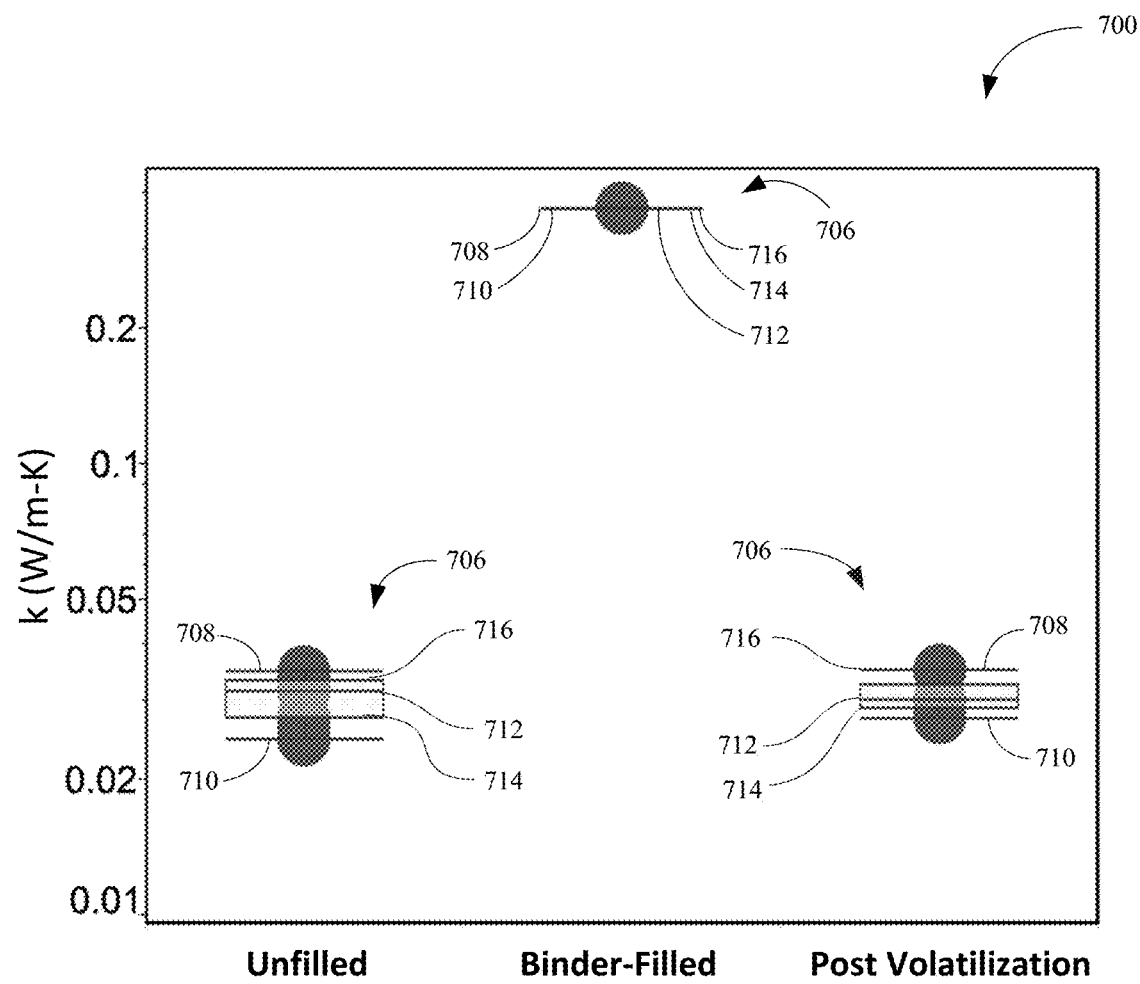
FIG. 7 is a representative graph depicting thermal conductivities for insulators that do not include a binder, insulator that include a binder, and insulators after the binder is volatilized (i.e. post burn-out), according to some illustrative embodiments.

FIG. 7 presents a representative graph 700 of thermal conductivities for specimens of insulator unfilled with binder, insulator filled with binder, and insulator post binder burn-out, according to some illustrative embodiments. The specimens of binder-filled insulator utilize PMMA as a binder, which is subsequently volatilized during heating to produce specimens of insulator post burn-out. The ordinate 702 uses a logarithmic scale and ranges from about 0.01 to 0.5 W/m·K. Values of thermal conductivity are presented in three groups, one for each type of specimen (i.e., see abscissa 704). A box plot 706 is laid over each grouping of data points and indicates a maximum value 708 and a minimum value 710. The box plot 704 also indicates a median 712, a first quartile 714, and a third quartile 716.

As evidenced by the box plots 706, thermal conductivities associated with the specimens of unfilled insulator are similar to those associated with the specimens of insulator post-volatilization. Thus, volatilization of the binder during heating restores the specimens of insulator post-volatilization to their seminal thermal conductivities. Moreover, a presence of binder in specimens of otherwise unfilled insulator is capable of increasing thermal conductivity. For the representative example depicted in FIG. 7, this increase is greater than an order of magnitude.

The insulators can be fabricated using a variety of methods. In one option, fabricating an insulator can include the step of wet-coating an insulator onto a substrate (e.g., a metallic foil). Alternatively, the insulator can be applied to the substrate, and the substrate can be wound around a container while still flexible. The insulator can be applied to the container directly. The step of wet-coating application may include dip coating, spray coating, die coating, knife coating, inkjet printing, gravure printing, or screen printing. A binder may be used to improve adhesion between the insulator and the metal foil in such a way as to minimize the negative impact to the thermal properties of the insulator.

Alternatively, the wet coating can include a ceramic, opacifier, fibrous material, and dissolved or suspended binder. Such wet coating methods may include dip coating, spray coating, die coating, knife coating, inkjet printing, gravure printing, or screen printing. Fabrication methods for the insulators may also include extrusion of a mixture comprising insulating ceramic, opacifier, ceramic fiber, and binder; injection molding of a mixture comprising insulating ceramic, opacifier, ceramic fiber, and binder; impregnation of a dissolved binder into pre-formed porous the inorganic thermally-insulating materials; and impregnation of a binder precursor into pre-formed porous the inorganic thermally-insulating materials followed by polymerization of the precursor. It will be appreciated that any combination of the aforementioned fabrication methods is possible.

According to another illustrative embodiment, a method for fabricating an insulator on a substrate, such as around a battery cell, can be accomplished by spray coating an insulator onto the substrate surface (e.g., battery cell can surface), and then drying the insulator as-sprayed. The insulator may be sprayed using a fluid that includes suspended particles therein. The fluid may also include opacifiers. The fluid may contain a compound to improve adhesion of the insulator to the battery cell. The method also includes the step of wrapping the insulator with a metal foil. In some embodiments, the method involves the step of subsequently compressing the as-sprayed insulator.

According to another illustrative embodiment, a method for fabricating an insulator around a substrate (e.g., battery cell) can be accomplished by pouring a slurry of insulator precursor into a wall around the substrate (e.g., cell), and drying the insulator as-poured. A wall thickness of the dried insulator can be selected such that a volume expansion of a components, such as battery cells) will compress the dried insulator to a predetermined density. In some embodiments, the method may use two walls, each wall being rigid. In these embodiments, the insulator may be disposed between an inner wall, which may be in contact with the substrate (e.g., battery cell) and an outer wall. The method can also include a step of iso statically hot-pressing the dried insulator to form a densified insulator.

Table 1 shows an example of making the insulator by slurry coating. A substrate including fumed SiO$_2$ inorganic thermally-insulating material, SiC opacifier, and a glass fiber were combined in a ratio of SiO$_2$:SiC:Glass Fiber::0.55:0.40:0.05. 60 wt % of 200 kDa polypropylene carbonate (PPC) binder in a solvent was added. The components were mixed in a thinky mixer (i.e., a planetary centrifugal mixer).

After mixing, the combined components were coated onto a substrate. The solvent was allowed to evaporate. The $SiO_2$, glass fibers, SiC, and PPC containing insulator were thereby coated on a substrate.

TABLE 1

| Mixing method | $SiO_2$:SiC:Glass Fiber (mass ratio) | 200 kDa polypropylene carbonate (wt %) | Thermal conductivity k (W/m-K, 100° C.) |
|---|---|---|---|
| Thinky mixer | 0.55:0.40:0.05 | 60% | 0.020 |

The PPC binder was burned out of the insulator. The thermal conductivity of the resulting mixture was measured at 0.020 W/m-K at 100° C.

In some variations, a binder can be incorporated into an insulator by dissolving the binder in a solvent to form a solution, exposing the insulator to the solution (e.g., soaking), and precipitating the binder within pores of the insulator. Such precipitation may be induced by evaporating the solvent from the solution, adding a precipitation agent to the solution (e.g. adding a second solvent with low solubility for the binder), and so forth.

Table 2 depicts an insulator prepared by absorbing the binder into the inorganic thermally-insulating material. A binder of PMMA or PPC was absorbed into a $SiO_2$ the inorganic thermally-insulating material, SiC opacifier, and glass fiber. A mixture of $SiO_2$ (the inorganic thermally-insulating material):SiC (opacifier):Glass fiber in a ratio of 60:38:2 at a density of 0.4 g/mL was used. Different combinations of binder were combined. In some cases, a surfactant (BYK-333, BYK Additives & Instruments, Geretsried, Germany) was added.

The cracking and bend strength of the resulting insulator were measured. In general, the increased binder load resulted in increased cracking of the inorganic thermally-insulating material substrate. In the absence of binder, or at very low binder wt %, there was either no or very little measured bend strength using a three point bend strength test.

In another example, the insulator can be formed by combining the inorganic thermally-insulating material with the binder by in-situ polymerization. For example, a sample of insulator can be immersed in a mixture of binder monomer (e.g., methyl methacrylate (MMA)), binder (e.g. PMMA), and one or more initiators (e.g., DMT or BPO). The mixture can be polymerized. Excess binder can be removed from the surface of the resulting material using an end-mill to yield binder-impregnated insulator.

Table 3 shows examples of an insulator formed by in-situ polymerization. A substrate of $SiO_2$ (the inorganic thermally-insulating material):SiC(opacifier):Glass fiber in a ratio of 60:38:2 and at a density of 0.4 g/mL was used. A mixture of MMA, PMMA, and one or more initiators was dissolved in a solvent such as dichloromethane or acetone to form the solution. Initiators BPO and DMT were added to the solution.

The solution was soaked for up to five separate periods for times ranging from 0.16 hours to 16 hours, at temperatures of 20° C., 70° C., or 120° C. The combined $SiO_2$, SiC, and glass fiber were soaked in binder, solvent, and initiators at 20° C. for a soak time of either 1.16-0.33 hours, 1.5 hours, or 16 hours. The composition was soaked a second time at 20° C. or 70° C. for between 0.16-0.83 hours, 1 hour, or 16 hours. The composition was soaked for a third period at 20° C., 70° C., or 120° C. for 1 hour, 12 hours, or 16 hours. Some of the compositions were soaked for a fourth period at 20° C., 70° C., or 120° C. for either 1 hour or 16 hours. Some compositions were composition was soaked for a fifth period at 20° C., 70° C., or 120° C. for 1 hour, 12 hours, or 16 hours.

The bend strength and thermal conductivity before and after the binder was volatilized were measured. The bend strength, as-made thermal conductivity, and post-burnout thermal conductivity of the resulting insulators were measured. In general, in the absence of binder, or at very low binder wt %, there was either no or very little measured bend strength. At a binder load of 78 wt %, the thermal conductivity of the as made compound was 0.37 W/m-K, which fell to 0.031 W/m-K post-binder burnout.

TABLE 2

| Binder | Quantity (g) | Surfactant | Quantity (g) | Binder loading (wt %) | Bend Strength (kN/m$^2$) | Inorganic thermally-insulating material Cracking |
|---|---|---|---|---|---|---|
| — | — | — | — | 0% | 62 | None |
| PPC | 10 | — | — | 18% | 176 | Severe |
| PPC | 10 | — | — | 14% | 176 | Moderate |
| PPC | 20 | — | — | 21% | 288 | Light |
| PPC | 40 | — | — | 28% | 555 | None |
| PMMA | 10 | — | — | 16% | 346 | Moderate |
| PMMA | 20 | — | — | 24% | 572 | High |
| PMMA | 40 | — | — | 37% | 708 | High |
| PMMA | 20 | — | — | 23% | 213 | Severe |
| PMMA | 20 | — | — | 25% | 174 | Severe |
| PMMA | 20 | — | — | 26% | — | Severe |
| PMMA | 20 | — | — | 24% | 145 | Severe |
| — | — | — | — | 0% | 58 | Very little |
| — | — | — | — | 1% | 51 | Very little |
| PMMA | 20 | BYK-333 | 1 | 28% | 245 | Severe |
| PMMA | 10 | — | — | 16% | 172 | Moderate |
| PMMA | 10 | BYK-333 | 1 | 17% | 176 | Moderate |

TABLE 3

| | Monomer (g) | Polymer (g) | Initiator 1 (g) | Initiator 2 (g) | Solvent (g) | Number of Soak Periods | Binder loading (wt %) | Bend Strength (kN/m$^2$) | Thermal conductivity (W/m-K, as made) | Thermal conductivity (W/m-K, post-binder burnout) |
|---|---|---|---|---|---|---|---|---|---|---|
| 1 | 50 g MMA | — | 0.678 g DMT | 1.211 g BPO | — | 5 | 22% | 245.046 | | |
| 2 | 50 g MMA | — | 0.678 g DMT | 1.211 g BPO | — | 4 | 68% | 1400 | | |
| 3 | 50 g MMA | — | 0.339 g DMT | 0.606 g BPO | — | 5 | 4% | 155.697 | | |
| 4 | 50 g MMA | — | 0.339 g DMT | 0.606 g BPO | — | 5 | 21% | 211.429 | | |
| 5 | 7.9 g MMA | 2.083 g PMMA-15K | 0.136 g DMT | 1.211 g BPO | 50 g DCM | 4 | 67% | 1036.23 | | |
| 6 | 50 g MMA | — | 0.678 g DMT | 1.211 g BPO | — | 5 | 56% | | | |
| 7 | 50 g MMA | — | 0.678 g DMT | 1.211 g BPO | — | 4 | 37% | 64.08 | | |
| 8 | 40 g MMA | 10 g PMMA-15K | 0.339 g DMT | 0.606 g BPO | — | 4 | 39% | | | |
| 9 | 40 g MMA | 10 g PMMA-15K | 0.339 g DMT | 0.606 g BPO | — | 4 | 60% | 1145.68 | | |
| 10 | 40 g MMA | 10 g PMMA-15K | 0.339 g DMT | 0.606 g BPO | — | 4 | 74% | 966.37 | | |
| 11 | 9.6 g MMA | 2.4 g PMMA-15K | 0.082 g DMT | 0.145 g BPO | — | 3 | 81% | 1054.37025 | | |
| 12 | 9.6 g MMA | 2.4 g PMMA-15K | 0.055 g DMT | 0.097 g BPO | — | 3 | 81% | 757.2825 | | |
| 13 | 9.6 g MMA | 2.4 g PMMA-15K | 0.041 g DMT | 0.073 g BPO | — | 3 | 38% | 192.23325 | | |
| 14 | 12 g MMA | — | 0.325 g DMT | 0.5813 g BPO | — | 3 | 72% | 920.3895 | | |
| 15 | 12 g MMA | — | 0.163 g DMT | 0.2906 g BPO | — | 3 | 76% | 1130.0985 | | |
| 16 | 12 g MMA | — | 0.082 g DMT | 0.145 g BPO | — | 0 | 0% | 27.59 | 0.030 | 0.030 |
| 17 | — | — | — | — | — | 0 | 0% | 30.26 | | |
| 18 | — | — | — | — | — | 0 | 0% | 32.93 | | |
| 19 | — | — | — | — | — | 0 | 0% | 80.1 | | |
| 20 | — | — | — | — | — | | | | | |
| 21 | 12 g MMA | — | 0.056 g DMT | 0.097 g BPO | — | 3 | 75% | 1246.6035 | | |
| 22 | 12 g MMA | — | 0.041 g DMT | 0.073 g BPO | — | 3 | 79% | 1403.88525 | | |
| 23 | 9.6 g MMA | — | 0.021 g DMT | 0.036 g BPO | — | 3 | 69% | 1281.555 | | |
| 24 | 9.6 g MMA | — | 0.01 g DMT | 0.018 g BPO | — | 3 | 19% | 72.09 | | |
| 25 | 9.6 g MMA | — | 0.041 g DMT | 0.073 g BPO | — | 3 | 81% | 1260.5841 | | |
| 26 | 12 g MMA | — | 0.082 g DMT | 0.145 g BPO | — | 3 | 78% | 1316.5065 | 0.37 | 0.031 |

In another example, polymethylmethacrylate (PMMA) may be dissolved in dichloromethane (i.e., CH$_2$Cl$_2$) to form a solution. The insulator may then be soaked in the solution to allow wet-impregnation of the solution into pores of the insulator. The soaked insulator is dried for 2 hours and then heated under vacuum for 3 hours at 50° C.

In another example, the insulator can be formed by coating the inorganic thermally-insulating material with a binder slurry (i.e., slurry coating). The inorganic thermally-insulating material, such as SiO$_2$, SiC, or glass fiber, is combined with a binder and solvent and mixed. The mixture can be coated on to a substrate (e.g. a foil such as aluminum foil), then heated under vacuum to remove the solvent and yield an insulator.

Specifically, in another example, the binder can be added to the insulator by polymer impregnation techniques. In one example, PMMA and MMA monomer was dissolved in dichloromethane or acetone to form a solution. The insulator may then be soaked in the solution to allow wet-impregnation of the solution into pores of the insulator. Initiators, such as benzoyl peroxide (BPO) and n,n-dimethyl-p-toluidine (DMT), are added to the solution and the insulator is soaked again. The insulator is removed from the solution and allowed to cure at room temperature from 1-16 hours. The insulator can subsequently cure at a temperature above 50° C. for an additional period of time (e.g., 70° C. for 1 hour).

In a further example, the insulator can be formed by various methods of compression molding. In one compression molding method, fumed $SiO_2$, SiC, glass fiber, polypropylene carbonate, and methyl-ethyl ketone can be combined and mixed until homogeneous. The mixture can be deposited on a substrate (e.g., mylar) and allowed to dry (e.g., 1-12 hours). The dried material is placed into a die, heated (e.g., to 70° C.), and pressed (e.g., ~5 tons of pressure) to yield an insulator.

Table 4 depicts insulators containing fumed silica and wt % combinations of 200 kDa and 10 kDa PPC binders prepared by compression molding. Fumed $SiO_2$, SiC, glass fiber, different combinations of 200 kDa PPC were combined and mixed using a banbury mixer or twin-screw extrusion. In paddle mixer embodiments, 10 kDa PPC and methyl-ethyl ketone were added. The combined components were mixed until homogeneous. In paddle mixer embodiments, the mixture was deposited on to a mylar substrate and allowed to dry overnight. The dried out material was placed into a 50×50×5 mm die, heated to 70° C., and pressed with ~5 tons of pressure to yield binder impregnated insulator.

TABLE 4

| Mixing method | SiO2:SiC:Glass Fiber (mass ratio) | 200 kDa PPC (wt %) | 10 kDa PPC (wt %) | Density (pre-burnout, g/mL) | Density (post-burnout, g/mL) | Thermal conductivity k (W/m-K, 100° C.) |
|---|---|---|---|---|---|---|
| Paddle mixer | 0.50:0.40:0.10 | 42% | 14% | 1.58 | 0.65 | 0.033 |
| Paddle mixer | 0.50:0.40:0.10 | 29% | 10% |  | 0.74 | 0.125 |
| Paddle mixer | 0.50:0.40:0.10 | 21% | 48% |  | 0.47 | 0.042 |
| Paddle mixer | 0.50:0.40:0.10 | 16% | 37% |  | 0.69 | 0.063 |
| Paddle mixer | 0.60:0.33:0.07 | 64% | 21% | 1.16 | 0.21 | 0.029 |
| Paddle mixer | 0.60:0.33:0.07 | 59% | 20% | 1.21 | 0.30 | 0.043 |
| Paddle mixer | 0.60:0.33:0.07 | 54% | 18% | 1.35 | 0.42 | 0.029 |
| Paddle mixer | 0.60:0.33:0.07 | 45% | 15% | 1.44 | 0.61 | 0.043 |
| Banbury | 0.55:0.40:0.05 | 61% | 0% |  | 0.58 | 0.028 |

The insulator density pre- and post-burnout binder burn-out was measured for various samples. The thermal conductivities for insulators mixed using a paddle mixture or a banbury mixer ranged from 0.028-0.125 W/m-K. In general, higher thermal conductivity increased with increased material density.

In a further variation of compression molding, fumed $SiO_2$, $TiO_2$, glass fiber, and polypropylene carbonate were mixed (e.g., in a Banbury mixer) at an elevated temperature (e.g., 70° C.) until the mixture was homogeneous. The mixture was added to a die, heated (e.g., to 70° C.), and pressed (e.g., with ~5 tons of pressure) to yield an insulator.

II. B. Insulators with a Reduced Mean Free Path

In other aspects, the insulator is an insulator including an inorganic thermally-insulating material that forms a porous structure configured to reduce the mean free path of gases in the insulator as compared to gases outside the porous structure. In some aspects, the inorganic thermally-insulating material can be nanoparticles that form a porous structure. The spaces between nanoparticles form pores in the insulator to reduce the mean free path of gases in the insulator as compared to ambient gas. The porous structure has a reduced mean free path for gasses passing therethrough. In various aspects, the insulator can be disposed between first and second battery cells and/or cell blocks, though other, non-battery related applications are contemplated. It will be recognized that the insulator can be used in any application, not limited to battery applications. It will be further recognized that the inorganic thermally-insulating material can be any inorganic thermally-insulating material described in the present disclosure.

Without wishing to be held to a particular mechanism or mode of action, inorganic thermally-insulating materials offer resistance to heat flows that move from hotter surfaces to cooler surfaces. This thermal resistance can stem from reduced areas of contact, which create repetitive constrictions along pathways in the insulator. The bulk thermal conductivity, $\lambda_{solid}$, of insulators formed of thermally-insulating nanoparticles can be on the order of $10^{-2}$ W/m·K or less. For example, and without limitation, an insulator formed of thermally-insulating silicon dioxide particles can have a bulk thermal conductivity of $10^{-3}$ W/m·K. In contrast, quartz (i.e., single or polycrystalline silicon dioxide) can have a bulk thermal conductivity of the order of $10^{0}$ W/m·K, or about three orders of magnitude higher.

Further, without wishing to be limited to any scientific principle or mode of action, an insulator exhibits an overall effective thermal conductivity, $\lambda$. $\lambda$ represents a resistance to heat flow in modes of thermal conduction, thermal convection, and thermal radiation. Thermal conduction involves heat transport predominantly through solids, including solids in contact with other solids. Thermal conduction may be quantified by a bulk thermal conductivity, $\lambda_{solid}$ or $\lambda_{bulk}$. Thermal convection involves heat transport predominantly through fluids (e.g., gases, liquids, etc.), and for a gas, may be quantified by a bulk thermal convection, $\lambda_{gas}$. Similarly, thermal radiation involves a net exchange of electromagnetic radiation between matter at different temperatures and may be quantified a bulk thermal radiation, $\lambda_{rad}$. Thus, the overall effective thermal conductivity, $\lambda$, is influenced by contributions from the bulk thermal conductivity, $\lambda_{solid}$ or $\lambda_{bulk}$, bulk thermal convection, $\lambda_{gas}$, and the bulk thermal radiation, $\lambda_{rad}$.

In some aspects, the insulator includes multi-functional thermally-insulating nanoparticles having a core-shell morphology in which a spherical core is coated alternatively with layers of insulator and opacifier, as described herein. These multi-functional nanoparticles may offer a high sphericity and may be controlled in size during fabrication. Due to a presence of the multi-functional nanoparticles, the insulator can exhibit a decrease in bulk thermal conductivity (i.e., a decrease in $\lambda_{solid}$), which may be better than one-tenth that of an insulator with uniform nanoparticles. Moreover, the insulator offers a better trade-off between $\lambda_{solid}$ and modifications of $\lambda_{gas}$ and $\lambda_{rad}$.

In some aspects, the insulator can include optionally compressed thermally-insulating nanoparticles, or alternatively aerogels, as discussed herein. The porous structure reduces the mean free path of air therein versus ambient air. In an insulator, the high porosity and resulting low contact area between insulating particles retards thermal heat flows, enabling larger solid bodies of low thermal conductivity. Moreover, the solid boundaries in the structure result in a low thermal convection.

In some variations, an insulator includes a plurality of thermally-insulating nanoparticles, each with alternating layers of structurally dissimilar materials. For example, and without limitation, the alternating layers of structurally dissimilar materials can include alternating layers of tungsten and aluminum oxide. In the plurality of thermally-insulating nanoparticles, an effective thermal resistivity comes from interfacial resistance between the alternating layers.

Figure 8:
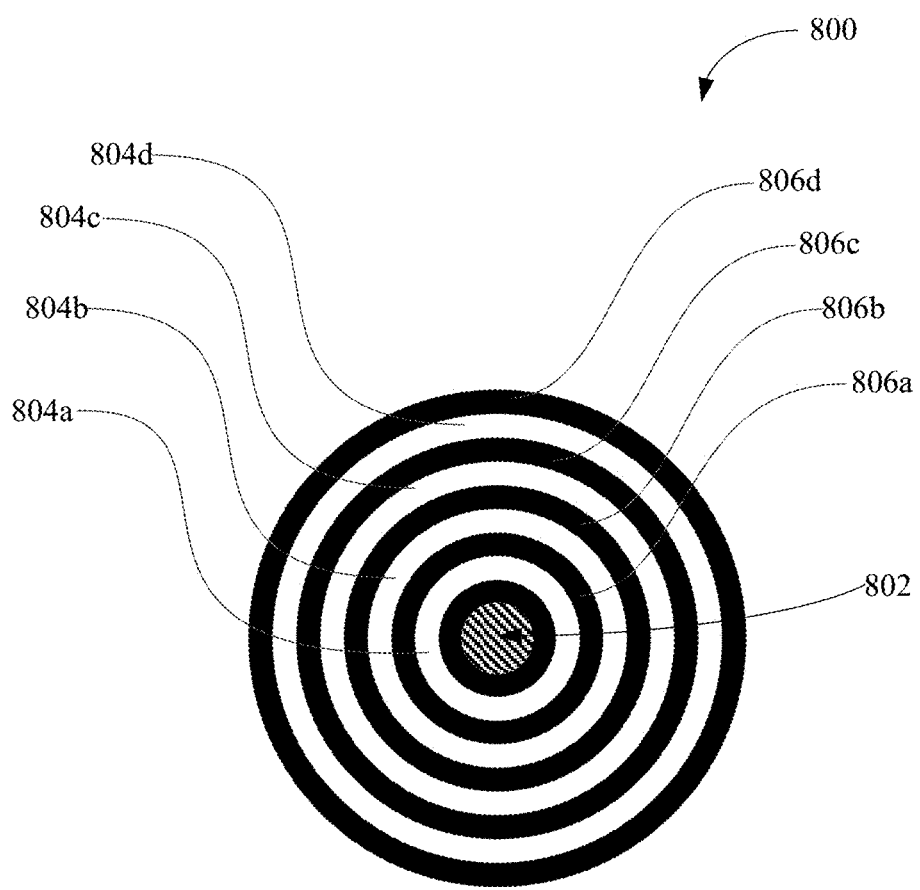
FIG. 8 depicts a cross-sectional view of an individual thermally-insulating multifunctional nanoparticle 800, according to an illustrative embodiment.

FIG. 8 depicts a cross-sectional view of an individual multifunctional thermally-insulating nanoparticle 800, according to an illustrative embodiment. The multifunctional thermally-insulating nanoparticle 800 includes a core 802 upon which alternating layers of structurally dissimilar materials form concentric shells. Core 802 is depicted as having a spherical shape, although other shapes are possible. In some embodiments, core 802 may be formed of an inorganic thermally-insulating material such as a silicon oxide material (e.g., $SiO_2$). The alternating layers include first layers 804a, 804b, 804c, and 804d, which each can be one of an insulator layer (e.g., aluminum oxide) or opacifier layer (e.g. tungsten), and second layers 806a, 806b, 806c, and 806d, that are the other of the insulating layer opacifier layer. In the case depicted in FIG. 8, insulators layers are referred to collectively as first layer 804. The opacifier layers are referred to collectively as second layer 806. One or more layer of each type of layer can be included in the multi-functional thermally-insulating nanoparticles. It will be recognized that the particle can terminate with either an insulator layer or an opacifier layer. In some variations, the outermost layer can have the lower thermal conductivity in order to reduce interparticle conductivity during contact.

Materials of the first layer 804 and the second layer 806 may have dissimilar atomic structures, hardnesses, Debye temperatures, or some combination thereof, in order to maximize phonon dispersion at the layer interfaces. The Debye temperatures associated with materials of the first layer 804 and the second layer 806 may exhibit a ratio greater than 2. For example, and without being limited by theory, the ratio of 2.6 corresponds to alternating layers of aluminum oxide ($T_D$=1047K) and tungsten ($T_D$=400K). Moreover, in some embodiments, the layers 804, 806 may be amorphous. In these embodiments, the amorphous nature of the layers 804, 806 may contribute to lower thermal conductivity. Representative examples of materials and their associated Debye temperatures are presented in Table 5.

TABLE 5

| Material | Debye Temperature, $T_D$ (K) |
| --- | --- |
| Aluminum oxide | 1047 |
| Tungsten | 400 |

Other material combinations for the first layer 804 and the second layer 806 include respectively, silica and carbon, silica and silicon carbide, silica and titanium oxide, silica and aluminum, and silica and aluminum nitride.

Additional factors may influence the selection of materials for the first layer 804 and the second layer 806. For example, and without limitation, materials of the first layer 804 and the second layer 806 may be selected to improve the robustness of the alternating layer structure to thermal cycling between −70° and 100° C. Materials of the first layer 804 and the second layer 806 may also be selected to exhibit chemical inertness to each other. Such inertness may impart low reactivity during heating.

The thermally-insulating nanoparticle 800 can be made using processes known by those skilled in the art to produce core-shell type particles. Such processes include atomic layer deposition, chemical vapor deposition, solution-coating from suspension, etc. It will be understood that, in these processes, the core 802 will be less in diameter than the desired final particle.

In some embodiments, an overall particle size of the thermally-insulating nanoparticle 800 is less than 50 nm. In some embodiments, the overall particle size is less than 40 nm. In some embodiments, the overall particle size is less than 20 nm. In some embodiments, the overall particle size is less than 10 nm. In some embodiments, the thermally-insulating nanoparticles exhibit a multi-modal distribution of particle sizes.

Thicknesses of the layers 804, 806 may range between 0.5-5 nm, with thinner layers preferable to disrupt phonon propagation through the alternating structure. In some embodiments, the thickness of the first layer 804 is less than 1 nm. In some embodiments, the thickness of the second layer 806 is less than 1 nm. In some embodiments, the thickness of the first layer 804 and the second layer 806 are both less than 1 nm.

Figure 9:
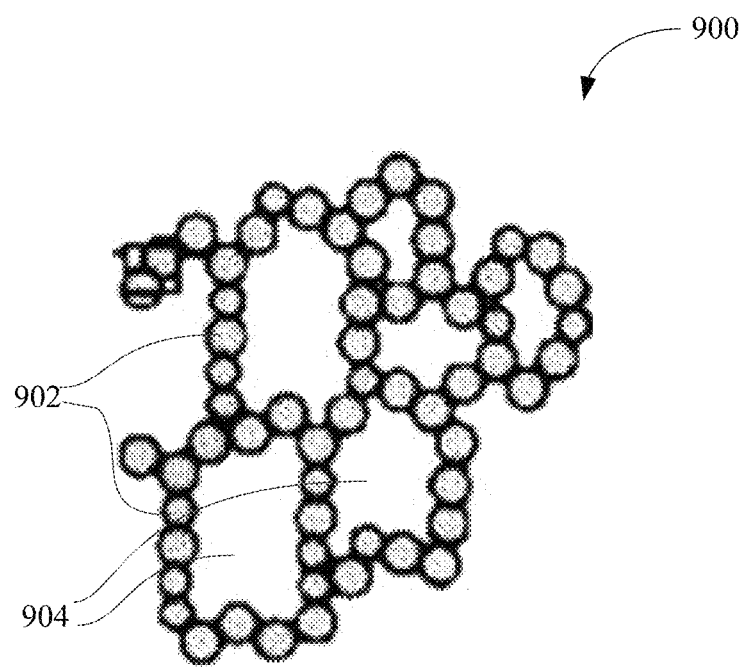
FIG. 9 depicts a cross-sectional view of a portion of an insulator, according to an illustrative embodiment.

FIG. 9 depicts a cross-sectional view of a portion of a multi-functional insulator 900 formed using thermally-insulating nanoparticles 902, according to an illustrative embodiment. In the insulator 900, individual thermally-insulating nanoparticles 902 aggregate to form cells 904, which may be open cells, closed cells, or combinations thereof. In some embodiments, the cells 904 are substantially all closed cells. It will be appreciated that the cells 904 can extended dimensionally to yield solid bodies of virtually any size and shape. However, due to the non-solid cell volume, these bodies can serve as insulators 900, and more particularly, insulators 900 for battery cells.

The thermal-insulating nanoparticles 902 have high sphericity in order to reduce a surface area of contact between adjacent particles. A reduced surface area of contact lowers an interface available for heat to flow between particles, thereby lowering the overall thermal conductivity of the insulator 900. For example, and without limitation, spherical nanoparticles of silicon dioxide can agglomerate and contact at reduced areas of contact, which may involve point contacts. Such agglomerates can form insulator bodies that bridge two or more surfaces of different temperature. The nanoparticles therein offer resistance to heat flows that move from hotter surfaces to cooler surfaces. The thermal resistance stems from reduced areas of contact, which create repetitive constrictions along interparticle pathways in the insulator body. The bulk thermal conductivity, $\lambda_{solid}$, of insulator bodies formed from spherical nanoparticles of silicon dioxide can be on the order of $10^{-3}$ W/m·K or less. In contrast, quartz (i.e., single or polycrystalline silicon dioxide) can have a bulk thermal conductivity of the order of $10^0$ W/m·K, or about three orders of magnitude higher.

In some embodiments, the insulator 900 is sealed, which may include cells 904 whose thermally-insulating nanoparticles 902 have been bonded at points of contact (e.g., via heating) to produce closed cells. The seals may be formed by metal or ceramic bonds that are stable beyond 800° C. In some of these embodiments, the closed cells are evacuated to an air pressure less than $10^1$ torr. In other of these embodiments, the air may be replaced by Ar, Kr, or Xe, which have lower thermal conductivity than air and a lower leak rate than vacuum.

In some aspects, after the thermal event, the porous structure of the insulator 910 can suppress a mean free path of gas molecules relative to a free, unrestricted space. This can occur, for example, if the porous structure includes closed cells. In such instances, heat transport via convection is suppressed. By way of example, and without limitation, the mean free path of molecules in air increases above approximately 200° C., and may be increase linearly. However, for an insulator formed of thermally-insulating nanoparticles (e.g., spherical particles of silicon dioxide), the mean free path of air through the insulator may remain roughly constant above a given temperature, for example approximately 200° C. The temperature can vary depending on pore structure and pore size.

According to an illustrative embodiment, the insulator 900 can be made by blending the thermally-insulating nanoparticles 902 with soluble, sublimable, or otherwise removable "filler" material and forming into dense compacts (e.g. pressing). Removal of the "filler" material would leave the cells 904. However, other methods of manufacture for the insulator 900 are possible.

In some embodiments, the thermally-insulating nanoparticles 902 can include an alternating sequence of layers in which one of the two layers is formed of material that strongly absorbs infrared radiation. In various aspects, the opacifier layer has a mean extinction coefficient greater than $1 \times 10^4$ m$^{-1}$ at temperatures greater than 250° C. In these embodiments, the insulator 900 may not require a separate infrared absorbing material therein.

According to an illustrative embodiment, a method for fabricating an insulator around a battery cell includes the step of pouring a slurry of insulator precursor into a wall around the cell and the step of drying the insulator as-poured. The method further includes forming the cell. A wall thickness of the dried insulator is selected such that a volume expansion of the cell will compress the dried insulator to a predetermined density. In some embodiments, the method may use two walls, each wall being rigid. In these embodiments, the insulator may be disposed between an inner wall, which may be in contact with the battery cell, and an outer wall.

Variations of insulators include an inorganic thermally-insulating material that forms a porous structure. An insulator containing thermally-insulating nanoparticles of fumed silicon dioxide fibers was prepared. The insulator was combined with an SiC opacifier. The fiber wt %, SiC opacifier wt %, and density were measured. The thermal conductivity of the insulator at 440° C. was measured for some samples.

II. C. Polymer-Coated Insulators

In further variations, the disclosure is directed a polymer-coated insulator including the inorganic thermally-insulating material and a polymer coating disposed on the surface of the inorganic thermally-insulating material.

As described herein, a polymer coating "disposed on" an inorganic thermally-insulating material includes embodiments in which at least a portion of the polymer coating is embedded in the inorganic thermally-insulating material. In such variations, adhesion between the polymer coating and the inorganic thermally-insulating material can be increased.

In various aspects, the inorganic thermally-insulating material can be silica-based. The silica-based inorganic thermally-insulating material can be a silica-based material, fibers, fused silica, aerogels, or a combination thereof. For example, in some variations the silica-based the inorganic thermally-insulating material can include fumed silica, SiC, and SiO$_2$ fiber. In other variations, the inorganic thermally-insulating material can be a ceramic material. In some variations, the materials do not degrade at temperatures of at least 500° C. or less.

The polymer coating can be disposed on the surface of the inorganic thermally-insulating material. In various non-limiting embodiments, the polymer can be any organic-based or silicone-based polymer known in the art. Example polymers can include polyurethanes, epoxies, polyacrylates, polyesters, and polyimides.

The polymer coating can be formed of polymers that adhere to the inorganic thermally-insulating materials. Further, the polymer coatings can be formed of materials with high thermal stability. In some variations, the polymer coatings do not degrade at temperatures up to 80° C. In some variations, the polymer coatings do not degrade at temperatures up to 120° C. In some variations, the polymer coatings do not degrade at temperatures up to 160° C. In some variations, the polymer coatings do not degrade at temperatures up to 200° C. Further, the polymer coatings do not produce toxic compounds upon heating within the temperature range of 100-900° C.

The polymer coating can have an average penetration depth into the inorganic thermally-insulating material. In some variations, the polymer coating can penetrate at least an average of 1 micron into the inorganic thermally-insulating material. In some variations, the polymer coating can penetrate at least an average of 5 microns into the inorganic thermally-insulating material. In some variations, the polymer coating can penetrate at least an average of 10 microns into the inorganic thermally-insulating material. In some variations, the polymer coating can penetrate at least an average of 25 microns into the inorganic thermally-insulating material. In some variations, the polymer coating can penetrate at least an average of 50 microns into the inorganic thermally-insulating material. In some variations, the polymer coating can penetrate at least an average of 100 microns into the inorganic thermally-insulating material. In some variations, the polymer coating can penetrate at least an average of 200 microns into the inorganic thermally-insulating material. In some variations, the polymer coating can penetrate at least an average of 300 microns into the inorganic thermally-insulating material.

In some variations, the polymer coating can penetrate less than an average of 300 microns into the inorganic thermally-insulating material. In some variations, the polymer coating can penetrate less than an average of 200 microns into the inorganic thermally-insulating material. In some variations, the polymer coating can penetrate less than an average of 100 microns into the inorganic thermally-insulating material. In some variations, the polymer coating can penetrate less than or equal to an average of 75 microns into the inorganic thermally-insulating material. In some variations, the polymer coating can penetrate less than or equal to an average of 50 microns into the inorganic thermally-insulating material. In some variations, the polymer coating can penetrate less than or equal to an average of 25 microns into the inorganic thermally-insulating material. In some variations, the polymer coating can penetrate less than or equal to an average of 10 microns into the inorganic thermally-insulating material. In some variations, the polymer coating can penetrate less than or equal to an average of 5 microns into the inorganic thermally-insulating material.

The thickness of the polymer coating can be controlled during deposition of the polymer coating onto the inorganic thermally-insulating material. By controlling the thickness of the polymer coating, mechanical properties of the inorganic thermally-insulating material can be controlled. As such, scratch resistance and adhesion of the polymer coating disposed on the inorganic thermally-insulating material can be improved over those the scratch resistance and adhesion for the inorganic thermally-insulating material alone.

In some variations, the thickness of the polymer coating is an average of less than or equal to 300 microns. In some variations, the thickness of the polymer coating is an average of less than or equal to 250 microns. In some variations, the thickness of the polymer coating is an average of less than or equal to 200 microns. In some variations, the thickness of the polymer coating is an average of less than or equal to 150 microns. In some variations, the thickness of the polymer coating is an average of less than or equal to 100 microns. In some variations, the thickness of the polymer coating is an average of less than or equal to 50 microns.

In some variations, the thickness of the polymer coating is an average of at least 25 microns. In some variations, the thickness of the polymer coating is an average of at least 50 microns. In some variations, the thickness of the polymer coating is an average of at least 75 microns. In some variations, the thickness of the polymer coating is an average of at least 100 microns. In some variations, the thickness of the polymer coating is an average of at least 125 microns. In some variations, the thickness of the polymer coating is an average of at least 140 microns. In some variations, the thickness of the polymer coating is an average of at least 150 microns. In some variations, the thickness of the polymer coating is an average of at least 175 microns. In some variations, the thickness of the polymer coating is an average of at least 200 microns.

The polymer coating can provide additional improved abrasion resistance, tensile strength, and shear strength to the ceramic coated the inorganic thermally-insulating material. In one example, a polyurethane polymer having a coating thickness of ~70 microns is applied to an inorganic thermally-insulating material formed of a combination of fumed silica, SiC, and $SiO_2$ fiber. The combination can provide good scratch resistance, ease of handling, and adhesion. A measured polymer coating thickness of ~140 microns can provide abrasion resistance.

In some variations, the polymer coating is the same thickness on all sides and areas of the inorganic thermally-insulating material. In other variations, the polymer coating has different thicknesses on different sides or areas of the inorganic thermally-insulating material. For example, a polymer coating can be disposed on one or more faces of the inorganic thermally-insulating material at a thickness of approximately 140 microns, while a polymer coating can be disposed on the edges of the inorganic thermally-insulating material at a thickness of approximately 70 microns. The thicker polymer coating (e.g., 140 microns) on the faces of the inorganic thermally-insulating material can provide abrasion resistance. The thinner polymer coating (e.g., 70 microns) on the edges of the inorganic thermally-insulating material can reduce heat transfer through the edges of the material. Alternatively, a polymer coating can have different thicknesses on different sides of the inorganic thermally-insulating material.

In various aspects, the polymer coating can provide for adhesion of other components to the inorganic thermally-insulating material. For example, a polymer coating can adhere a protective sheet to the surface of the inorganic thermally-insulating material. Other components known in the art can be used as well.

In various aspects, the polymer coating disposed on the surface of the inorganic thermally-insulating material can provide improved tensile strength over the tensile strength of the inorganic thermally-insulating material. The polymer coating can also reduce material loss of microporous material from the edges of the inorganic thermally-insulating material.

The polymer coating can be applied to the inorganic thermally-insulating material using various methods known in the art. Non-limiting methods include spray coating, dip coating, flow coating, and knife coating methods.

In various, non-limiting methods, the surface of an inorganic thermally-insulating material can be exposed to a coating composition to form a polymer coating on the surface of the inorganic thermally-insulating material. The polymer coating is allowed to penetrate at least an average of 10 microns into the inorganic thermally-insulating material. The polymer coating is then solidified. It will be recognized that other components such as fibrous materials and opacifiers can be added to the inorganic thermally-insulating material prior to addition of the polymer coating in any variation described herein.

In various aspects, the coating composition can include compounds used to form a polymer. In some instances, the coating composition can include polymer precursors such as monomers. In some instances, the coating composition can include polymers. It will be recognized by those in the art that the coating composition can include any compounds used to make the composition. The coating composition can also include additives, including additives that can alter the viscosity of the coating composition.

In some variations, the inorganic thermally-insulating material can be spray coated with a coating composition. Spray coating can be accomplished by any of a variety of methods. For example, one, two, or more low volume high pressure (LVHP) or high volume low pressure (HVLP) spray sources (e.g., spray guns) can be used. The spray source can be placed at a distance from the inorganic thermally-insulating material. In some instances, the spray source is at a distance of 30-40 cm. In some instances, the spray source is at a distance of 10-15 cm. Optionally, the coated surface can be allowed to set for a period of time (e.g., 10-20 minutes) at ambient temperature and pressure.

In some variations, the coated surface is cured. Depending on the polymer coating, the polymer coating can be cured at room temperature or by heat curing. Further, multiple spray coatings can be applied, optionally with different combinations of volumes and pressures, and/or different viscosities.

Different surfaces of the inorganic thermally-insulating material can be coated by the coating composition. An already coated surface can be masked to allow a different surface to be coated. Further, different surfaces can be coated to different average penetration depths, or even with different polymer coatings.

It will be recognized by those skilled in the art that the spray sources, amount of coating composition, the viscosity of the coating composition, and other factors can be adjusted to control various aspects of the polymer coating. For example, an increased amount of coating composition in general increases the average thickness of the polymer coating on the surface of the inorganic thermally-insulating material. Increasing the viscosity of the coating composition can reduce the penetration depth of the polymer coating into the inorganic thermally-insulating material. The curing time and temperature can be adjusted.

In some variations, cloth, fiberglass, or plastic coverings can be disposed over the polymer coated insulator. tightly held to the polymer coated insulators (e.g., by vacuum sealing). Additional covering material can be used at the seams to allow for sealing.

In some variations, the polymer coating can act as a moisture barrier for the inorganic thermally-insulating material. For example, water impermeable polymer coatings can be used. Water impermeable polymer coatings can thereby repel water from the inorganic thermally-insulating material. When the inorganic thermally-insulating material materials are water sensitive or water soluble, the polymer coating can inhibit water from entering the water sensitive the inorganic thermally-insulating material.

In some additional variations, the polymer coatings can be disposed on other insulator materials, such as brittle insulator materials or friable insulator material. The polymer coatings can be disposed on the other insulators as described herein for the inorganic thermally-insulating materials. It will be recognized that the insulator can be used in any application, not limited to battery applications. It will be further recognized that the inorganic thermally-insulating materials and other components can be any inorganic thermally-insulating material described in the present disclosure.

III. Fibrous Materials

In various aspects, the insulator can include a fibrous material. In various aspects, the fibrous material can include glass fibers, ceramic fibers, silica fibers, silicon carbide fibers, carbon fibers, carbon nanotubes, and other fibrous materials known in the art. The fibrous material can be associated with the inorganic thermally-insulating material. Alternatively, the fibrous material can be associated with the opacifier (as described below) during formulation. Without wishing to be held to a particular mechanism or mode of action, the fibrous material can impart mechanical strength to the inorganic thermally-insulating material.

In some embodiments, the opacifier can include a fibrous material. In these embodiments, the fibrous material can reduce radiative heat transfer. The fibrous material may also impart mechanical strength to the insulator. Non-limiting examples of the fibrous materials include silicon carbide fibers, carbon fibers, and carbon nanotubes. Other fibrous materials are possible.

IV. Opacifiers

In various aspects, the opacifier absorbs or scatters electromagnetic radiation at near-infrared to long-wavelength infrared wavelengths (i.e., about 0.7-15 um), allowing the insulator to impede a propagation of radiative heat. Opacifiers can have a mean extinction coefficient greater than $1 \times 10^4$ m$^{-1}$ at temperatures greater than 250° C.

By way of example, and without limitation, the thermally-insulating material may be mixed with a carbonaceous opacifier to reduce radiative heat transfer. Any thermally-insulating material can be used, including any inorganic thermally-insulating materials described herein. As such, the insulator may experience a reduction in radiative heat transfer at temperatures greater than about 100° C. The corresponding reduction in thermal conductivity may be greater than 0.01 W/(m·K) at 100° C. In various embodiments, the carbonaceous opacifier is coated with a refractory material to keep oxygen from being in contact with the carbonaceous opacifier, thereby inhibiting oxidation of the carbonaceous material.

In some variations, the opacifier is a carbonaceous material, such as graphite. Carbonaceous materials can have extinction coefficients that are an order of magnitude higher, per unit mass, in the infrared regime than other opacifiers, such as SiC, $TiO_2$, or $Al_2O_3$. Using a carbonaceous material can improve a thermal conductivity of insulators. For example, and without limitation, using graphite instead of SiC can reduce the thermal conductivity by 50% at 800° C.

In some variations, the carbonaceous material can include at least 80% carbon. In some variations, the carbonaceous material can include at least 85% carbon. In some variations, the carbonaceous material can include at least 90% carbon. In some variations, the carbonaceous material can include at least 95% carbon.

In additional variations, by way of illustration and not limitation, the carbonaceous material can have average particle size of at least 20 nm in any one dimension. In another variation, the carbonaceous material can have average particle size of at least 50 nm in any one dimension. In another variation, the carbonaceous material can have average particle size of at least 100 nm in any one dimension. In another variation, the carbonaceous material can have average particle size of at least 200 nm in any one dimension. In another variation, the carbonaceous material can have average particle size of at least 500 nm in any one dimension. In another variation, the carbonaceous material can have average particle size of at least 1 micron in any one dimension. In another variation, the carbonaceous material can have average particle size of at least 5 microns in any one dimension. In another variation, the carbonaceous material can have average particle size of at least 10 microns in any one dimension. In another variation, the carbonaceous material can have average particle size of at least 15 microns in any one dimension.

In additional variations, by way of illustration and not limitation, the carbonaceous material can have average particle of not more than 20 microns in any one dimension. In another variation, the carbonaceous material can have average particle size of not more than 15 microns in any one dimension. In another variation, the carbonaceous material can have average particle size of not more than 10 microns in any one dimension. In another variation, the carbonaceous material can have average particle size of not more than 5 microns in any one dimension. In another variation, the carbonaceous material can have average particle size of not more than 1 microns in any one dimension. In another variation, the carbonaceous material can have average particle size of not more than 500 nm in any one dimension. In another variation, the carbonaceous material can have average particle size of not more than 200 nm in any one dimension. In another variation, the carbonaceous material can have average particle size of not more than 100 nm in any one dimension. In another variation, the carbonaceous material can have average particle size of not more than 50 nm in any one dimension. In another variation, the carbonaceous material can have average particle size of not more than 20 nm in any one dimension.

In some variations, the opacifier includes a carbonaceous material. The carbonaceous material can be coated with a refractory material to inhibit oxidation of the carbonaceous material at a carbon oxidation temperature. In the absence of a refractory material, the carbon oxidation temperature may be greater than 400° C. When coated with a refractory material, the carbon oxidation temperature may be greater than 600° C. When coated with a refractory material, the carbon oxidation temperature may be greater than 800° C. When coated with a refractory material, the carbon oxidation temperature may be greater than 1000° C. In some variations, the refractory coated carbon oxidation temperature may be 600-1200° C., or greater. The carbonaceous material may be graphite, carbon black, carbon nanotubes, or graphene.

In some variations, the refractory coating is covalently attached to the carbonaceous material. Without wishing to be limited to a particular mechanism or mode of action, the carbonaceous material can be modified to form functional groups (e.g., oxygen-containing functional groups). The functional groups can be covalently bonded to the refractory material.

It will be recognized that the insulator can include a thermally-insulating material and the refractory coated carbonaceous opacifier. The thermally-insulating material can be any thermally-insulating material disclosed in the art, including, but not limited to, inorganic thermally-insulating materials disclosed herein. It will be recognized that refractory coated carbon opacifiers do not need to be incorporated into insulators, or can be used independently of insulators. It also will be recognized that the opacifiers described herein can be used in the absence of the insulators described herein.

In some variations, the insulator can include equal to or less than 50 wt % of opacifier. In some variations, the insulator can include equal to or less than 40 wt % of opacifier. In some variations, the insulator can include equal to or less than 30 wt % of opacifier. In some variations, the insulator can include equal to or less than 20 wt % of opacifier. In some variations, the insulator can include equal to or less than 10 wt % of opacifier.

In some instances, the carbonaceous material has a high aspect ratio, which may increase radiation absorption and provide mechanical strength to the insulator. The aspect ratio may be greater than 5:1 (e.g., a rod-shaped carbon body). Further, in some instances, the aspect ratio is greater than 10:1. In some instances, the aspect ratio is greater than 15:1. In some instances, the aspect ratio is greater than 20:1. In some instances, the aspect ratio is greater than 100:1. In some instances, the aspect ratio is greater than 250:1. In some instances, the aspect ratio is greater than 100:1. In some instances, the aspect ratio is greater than 500:1. In some instances, the aspect ratio is greater than 750:1. In some instances, the aspect ratio is greater than 100:1. In some instances, the aspect ratio is greater than 1000:1. In some instances, the aspect ratio is greater than 2000:1.

In some embodiments, the infrared absorbing materials can include carbon nanotubes with high tensile strength. In these embodiments, a surface of the carbon nanotubes has been oxidized to reduce thermal conductivity. The carbon nanotubes may be selected with a specific chirality, a specific number of walls, or both, to lower thermal conductivity.

In some embodiments, the insulators can include infrared absorbing materials (e.g., carbonaceous materials) coated with the inorganic thermally-insulating materials (e.g., $SiO_2$, $Al_2O_3$, etc.) in order to mitigate thermal conduction via contact between infrared absorbing particles.

In one example, the $Al_2O_3$-coated carbon opacifier is prepared by atomic layer deposition. Uncoated carbon was dried at 180° C. Six cycles of ALD alumina were coated onto the fluidized carbon at 50° C. The fluidized carbon was then raised to 180° C. again for drying. Sixteen additional cycles of ALD alumina were coated onto the substrate for a total of 22 coating cycles.

In some variations, the opacifier is greater than 0.05 wt % of solid components in the insulator (i.e. the total of the inorganic thermally-insulating material, fibrous material, opacifier, and any other solid components in the insulator). In some variations, the opacifier is greater than 0.25 wt % of solid components in the insulator. In some variations, the opacifier is greater than 0.50 wt % of solid components in the insulator. In some variations, the opacifier is greater than 0.75 wt % of solid components in the insulator. In some variations, the opacifier is greater than 1.0 wt % of solid components in the insulator. In some variations, the opacifier is greater than 2.5 wt % of solid components in the insulator. In some variations, the opacifier is greater than 3.0 wt % of solid components in the insulator. In some variations, the opacifier is greater than 3.5 wt % of solid components in the insulator. In some variations, the opacifier is greater than 4.0 wt % of solid components in the insulator. In some variations, the opacifier is greater than 4.5 wt % of solid components in the insulator. In some variations, the opacifier is greater than 5.0 wt % of solid components in the insulator.

In another example, insulator was fabricated in a weight ratio of 80.8:3:16.2 fumed silica:carbon opacifier:silica fiber. Fumed silica was the inorganic thermally-insulating material, the coated carbon was the opacifier, and silica fiber was the fibrous material. The mixtures were mixed for a total of 35 min, more than standard microporous insulation.

It will be appreciated that, for opacifier functionality, the insulators can include materials in addition to or in lieu of carbonaceous materials. In some embodiments, the insulator includes iron titanium oxide (e.g., $FeTiO_3$). The iron titanium oxide can function as an infrared absorbing material that creates an opacifier effect in the insulator. Relative to the inorganic thermally-insulating material alone, a presence of iron titanium oxide can reduce a bulk thermal conductivity of the blended material.

In some embodiments, the insulator includes infrared absorbing materials with a high aspect ratio (e.g., rods or plates). In these embodiments, the high aspect ratio enables the insulator to exhibit a higher effective infrared absorption relative to spheroidal particles alone. Non-limiting examples of such materials include metallic materials, silicon carbide materials, and titanium oxide materials. Other materials are possible, including metal oxides, carbides, borides, or refractory metals. These materials may exhibit various morphologies such as fibers, rods, and plates.

In some embodiments, the opacifier materials can include metal flakes. In such embodiments, the metal flakes can be incorporated with a preferential orientation in the insulator. For example, and without limitation, a thin dimension of the metal flakes could be perpendicular to a plane of the insulator (e.g., in sheet form), thereby providing a low through-plane conductivity and high in-plane conductivity.

In one aspect, the disclosure is directed to an insulating composition including aerogel particles and a plurality of coated carbon particles. In various aspects, the coated carbon particles are distributed in the aerogel particles.

Each coated carbon particle includes a refractory material disposed on carbonaceous material. The carbon particles act as opacifiers by absorbing infrared radiation. Carbon particles can include any type of carbon particle known in the art, including, but not limited to, graphite, carbon black, carbon nanotubes, graphene, and combinations thereof. The refractory material disposed on the carbon particle can be temperature resistant, and can shield the carbon particle from the surrounding environment. Without wishing to be held to any particular mechanism or mode of action, the refractory material inhibits oxidation of the carbon particle at high temperatures (e.g., 500° C. or greater). As such, the coated carbon particles act as an opacifier at both ambient and high temperatures.

In various aspects, the refractory material can include, but is not limited to, materials such as silica, alumina, titania, nickel, boron nitride, zirconia, and $AlF_3$. In some aspects, the refractory material can include a single material. In other aspects, the coating layer can include multiple materials. Further, it will be recognized that the coated carbon particles can include multiple refractory materials. In some variations, the coated carbon particles can be in the form of a powder.

Coated carbon particles can be made using processes known by those skilled in the art. Non-limiting processes of disposing a coating layer on the surface of carbon particles include atomic layer deposition, chemical vapor deposition, and solution-coating from suspension.

The insulating compositions can be used as insulators between battery cells. In various non-limiting embodiments, the aerogel-coated carbon insulating compositions can be used as an insulator in a battery cell in the same manner as insulators, as described herein. For example, the compositions can be used as insulators in the thermal separation or isolation of individual battery cells in a multi-cell battery pack.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An apparatus comprising:
   a first battery cell and a second battery cell; and
   an insulator disposed between the first battery cell and the second battery cell; the insulator comprising:
   an inorganic thermally-insulating material having a porous structure; and
   a binder that volatilizes when the first or second battery undergoes a thermal event, the binder disposed within the porous structure, wherein the insulator comprises at least 10 vol % of the binder,
   wherein a thermal conductivity of the insulator is less than 0.05 W/m·K at 25° C. after the thermal event, and
   wherein a thermal conductivity of the insulator is greater than 0.1 W/m·K at 25° C. before the thermal event.

2. The apparatus of claim 1, wherein the porous structure has a mean pore diameter of less than 500 nm.

3. The apparatus of claim 1, wherein the thermally-insulating material comprises fumed silica.

4. The apparatus of claim 1, wherein the thermally-insulating material comprises silica aerogel.

5. The apparatus of claim 1, wherein the binder is polypropylene carbonate.

6. The apparatus of claim 1, wherein the insulator comprises at least 20 vol % of the binder.

7. The apparatus of claim 1, wherein the insulator comprises at least 50 vol % of the binder.

8. The apparatus of claim 1, wherein the insulator comprises at least 70 vol % of the binder.

9. The apparatus of claim 1, wherein the binder volatilizes at a temperature not greater than 500° C. at 1 atmosphere pressure.

10. The apparatus of claim 1, further comprising a fibrous material in contact with the inorganic thermally-insulating material.

11. The apparatus of claim 1, wherein the binder volatilizes at a temperature not greater than 300° C. at 1 atmosphere pressure.

12. The apparatus of claim 1, wherein the binder volatilizes at a temperature not greater than 250° C. at 1 atmosphere pressure.

13. The apparatus of claim 1, wherein the binder volatilizes at a temperature not greater than 200° C. at 1 atmosphere pressure.

14. The apparatus of claim 1, wherein the binder volatilizes at a temperature not greater than 175° C. at 1 atmosphere pressure.

15. The apparatus of claim 1, wherein the binder volatilizes at a temperature not greater than 150° C. at 1 atmosphere pressure.

16. The apparatus of claim 1, wherein the insulator has a density of at least 0.15 g/mL after the thermal event.

17. The apparatus of claim 1, wherein the insulator has a thermal conductivity at 25° C. of not more than 0.4 W/(m*K) after the thermal event.

18. The apparatus of claim 1, comprising a fibrous material in contact with the inorganic thermally-insulating material.

19. The apparatus of claim 18, wherein the fibrous material is selected from glass fibers, ceramic fibers, and silica fibers.

20. The apparatus of claim 19, wherein the fibrous material comprises glass fibers.

21. The apparatus of claim 1, comprising an opacifier comprising silicon carbide, titania, or a carbonaceous material.

22. The apparatus of claim 21, wherein the opacifier comprises silicon carbide.

23. The apparatus of claim 21, wherein the opacifier comprises titania.

24. The apparatus of claim 1, wherein the insulator has a larger mechanical strength before the thermal event than after the thermal event.

25. The apparatus of the insulator of claim 24,
   wherein the mechanical strength is a bend strength; and
   wherein the bend strength is at least ten times greater before the thermal event than after the thermal event.

* * * * *